(12) United States Patent
Nagao et al.

(10) Patent No.: US 8,681,389 B2
(45) Date of Patent: Mar. 25, 2014

(54) IMAGE PROCESSING APPARATUS, IMAGE PROCESSING SYSTEM, FACSIMILE TRANSMISSION METHOD, AND PROGRAM

(75) Inventors: Masafumi Nagao, Kanagawa (JP); Ayako Watanabe, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 327 days.

(21) Appl. No.: 13/067,561

(22) Filed: Jun. 9, 2011

(65) Prior Publication Data

US 2011/0317223 A1 Dec. 29, 2011

(51) Int. Cl.
*H04N 1/00* (2006.01)

(52) U.S. Cl.
CPC ....... *H04N 1/00002* (2013.01); *H04N 1/00204* (2013.01)
USPC .......................... 358/442; 358/406; 358/405

(58) Field of Classification Search
USPC .......... 358/448, 400, 426.03, 426.08, 426.16, 358/443, 442, 405, 406
See application file for complete search history.

(56) References Cited

U.S. PATENT DOCUMENTS

| | | | | |
|---|---|---|---|---|
| 8,125,924 B2 * | 2/2012 | Balb et al. | ...................... | 370/253 |
| 8,451,749 B2 * | 5/2013 | Tanaka et al. | .................. | 370/253 |
| 2007/0017794 A1 * | 1/2007 | Highgate et al. | ......... | 204/157.15 |
| 2010/0034534 A1 * | 2/2010 | Niibe et al. | ...................... | 398/25 |
| 2011/0051737 A1 * | 3/2011 | Chiang | ........................ | 370/401 |
| 2013/0088996 A1 * | 4/2013 | Hara | ............................. | 370/252 |

FOREIGN PATENT DOCUMENTS

| | | | | |
|---|---|---|---|---|
| JP | 62-026974 | * | 2/1987 | ............... H04N 1/32 |
| JP | 6-054171 | * | 2/1994 | ............... H04N 1/00 |
| JP | 3153781 A | | 1/2001 | |
| JP | 4391032 | | 10/2009 | |

OTHER PUBLICATIONS

Abstract of Japanese Patent Publication No. JP2002-290647, published on Oct. 4, 2002.
Abstract of Japanese Patent Publication No. JP10-334007, published on Dec. 18, 1998.

* cited by examiner

*Primary Examiner* — Jerome Grant, II
(74) *Attorney, Agent, or Firm* — Harness, Dickey & Pierce, P.L.C.

(57) ABSTRACT

An image processing apparatus includes a first acquiring unit and a selecting unit. The first acquiring unit acquires information on respective communication capacities of a plurality of transmitters with a facsimile communication function and communication capacity of a partner device to be in facsimile communication with the transmitter. The selecting unit selects a transmitter having communication capacity that is the same as or closest to the communication capacity of the partner device from the plurality of transmitters.

10 Claims, 18 Drawing Sheets

FIG.5

| FAX NUMBER OF PARTNER DEVICE | COMMUNICATION CAPACITY |
|---|---|
| 03-xxx-xxx | TRANSMISSION MODE=ECM<br>COMPRESSION FORMAT=MH/MR/MMR<br>IO SPEED=0/2.5/5/10/20/40 (ms/line)<br>PER-MILLIMETER/PER-INCH LINE DENSITY=TO 200 × 200 dpi<br>RECORD LENGTH/WIDTH=TO A4 × A3<br>SMOOTHING=NO PROHIBITION |
| 03-xxx-xxx | TRANSMISSION MODE=NORMAL<br>COMPRESSION FORMAT=MH/MR/MMR/JBIG<br>IO SPEED=0/2.5/5/10/20/40 (ms/line)<br>PER-MILLIMETER/PER-INCH LINE DENSITY=TO 200 × 200 dpi<br>RECORD LENGTH/WIDTH=TO A4 × A3<br>SMOOTHING=NO PROHIBITION |

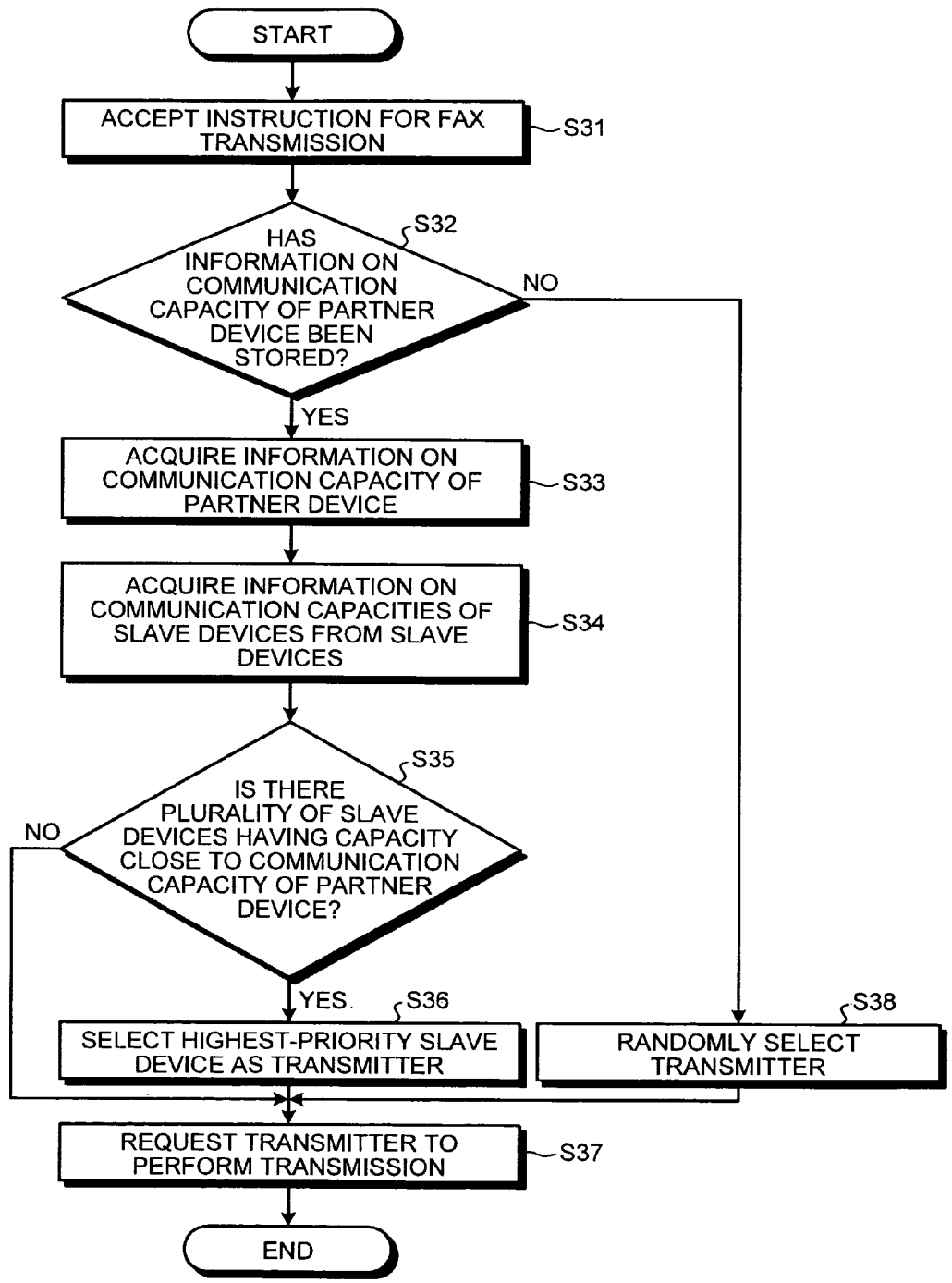

FIG.8

| COMMUNICATION CAPACITY | PRIORITY |
|---|---|
| COMPRESSION FORMAT | 2 |
| LINE DENSITY | 1 |
| ⋮ | ⋮ |

FIG.9A

COMMUNICATION CAPACITY OF SLAVE DEVICE 200a

```
COMPRESSION FORMAT=MH/MR/MMR/JBIG
PER-MILLIMETER/PER-INCH LINE DENSITY=TO 200 × 100 dpi
              ⋮
```

FIG.9B

COMMUNICATION CAPACITY OF SLAVE DEVICE 200b

```
COMPRESSION FORMAT=MH/MR/MMR
PER-MILLIMETER/PER-INCH LINE DENSITY=TO 200 × 200 dpi
              ⋮
```

FIG.9C

COMMUNICATION CAPACITY OF PARTNER DEVICE

```
COMPRESSION FORMAT=MH/MR/MMR/JBIG
PER-MILLIMETER/PER-INCH LINE DENSITY=TO 200 × 200 dpi
              ⋮
```

FIG.11

INPUT VALUE

PER-MILLIMETER/PER-INCH LINE DENSITY=TO 200 × 200 dpi

COMMUNICATION CAPACITY OF SLAVE DEVICE 200a

COMPRESSION FORMAT=MH/MR/MMR/JBIG
PER-MILLIMETER/PER-INCH LINE DENSITY=TO 200 × 100 dpi

COMMUNICATION CAPACITY OF SLAVE DEVICE 200b

COMPRESSION FORMAT=MH/MR/MMR/JBIG
PER-MILLIMETER/PER-INCH LINE DENSITY=TO 200 × 200 dpi

COMMUNICATION CAPACITY OF PARTNER DEVICE

COMPRESSION FORMAT=MH/MR/MMR/JBIG
PER-MILLIMETER/PER-INCH LINE DENSITY=TO 200 × 200 dpi

⋮

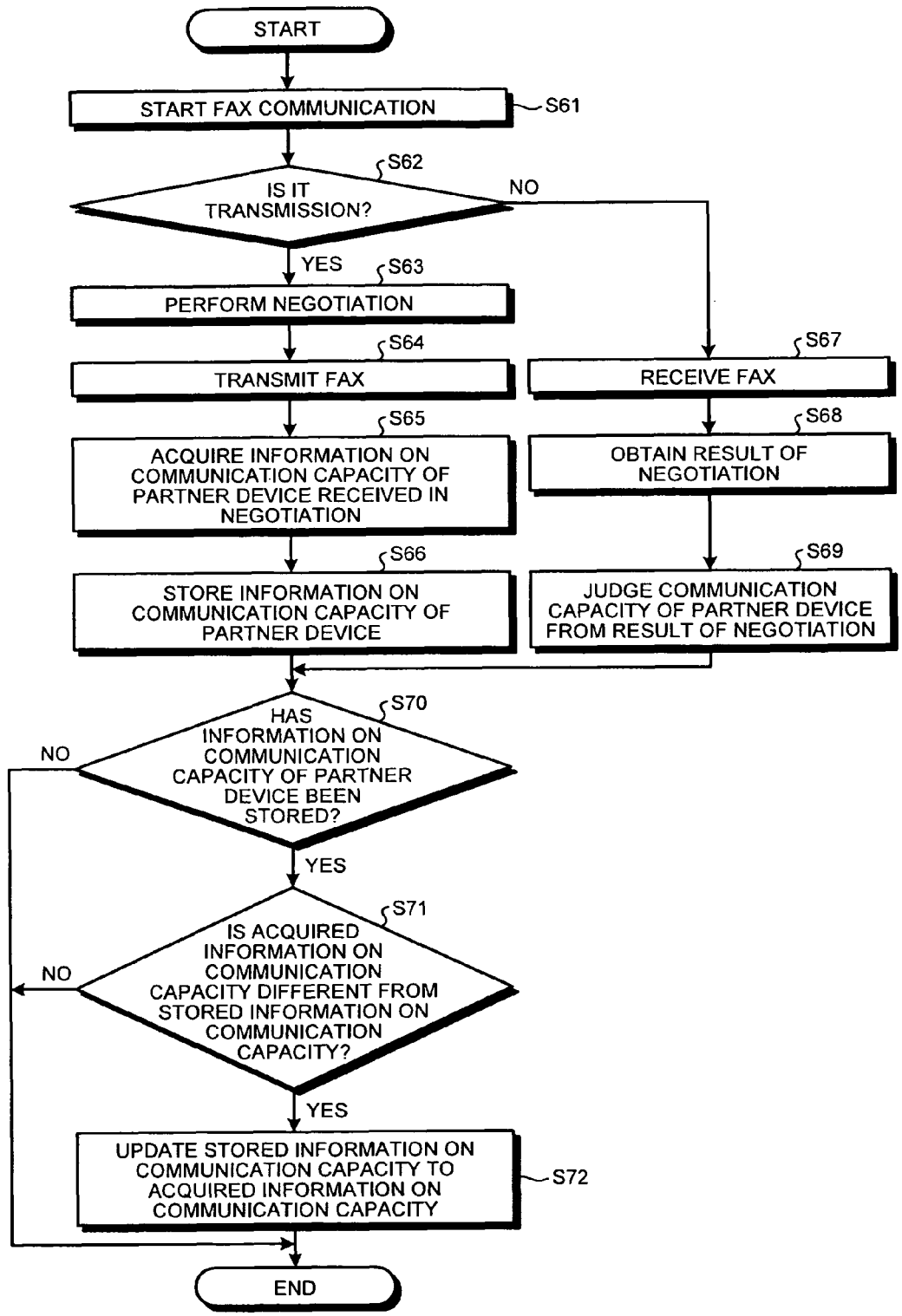

IMAGE PROCESSING APPARATUS, IMAGE PROCESSING SYSTEM, FACSIMILE TRANSMISSION METHOD, AND PROGRAM

CROSS-REFERENCE TO RELATED APPLICATIONS

The present application claims priority to and incorporates by reference the entire contents of Japanese Patent Application No. 2010-146753 filed in Japan on Jun. 28, 2010.

BACKGROUND OF THE INVENTION

1. Field of the Invention

The present invention relates to an image processing apparatus and an image processing system.

2. Description of the Related Art

There has been conventionally known an image processing system in which, in an environment that a plurality of image processing apparatuses, such as a fax apparatus, a printer apparatus, and an multifunction peripheral (MFP), is connected to a network, a first apparatus that has accepted an instruction to perform output processing of image data may request a second apparatus to execute a process that the first apparatus cannot perform.

For example, there is proposed a method in which, when an apparatus that does not have a fax transmission function has accepted an instruction to perform processing of fax transmission, the apparatus which has accepted the instruction to perform processing of fax transmission asks another image processing apparatus that can be communicated with, whether the image processing apparatus has a fax transmission function, and requests the image processing apparatus to perform fax transmission if the apparatus receives a reply to the effect that the image processing apparatus has a fax transmission function (for example, see Japanese Patent Application Laid-open No. 2002-290647).

In the method disclosed in Japanese Patent Application Laid-open No. 2002-290647, if a plurality of apparatuses having the fax transmission function is connected to a network, a user or the apparatus which has accepted the instruction to perform processing of fax transmission arbitrarily selects one apparatus from the plurality of apparatuses, and requests the selected apparatus to perform fax transmission.

Before the selected fax-transmitting-side apparatus (hereinafter, referred to as the "transmitter") actually faxes image data to a receiving-side apparatus (hereinafter, referred to as a "receiver"), the transmitter exchanges information on capacity of the apparatus with the receiver, and determines a transmission condition, and then faxes actual image data to the receiver (hereinafter, referred to as "negotiation"). Here, the transmission condition is determined to conform to capacity which both the transmitter and the receiver have.

However, in the case where fax transmission is realized in cooperation with another apparatus, a user-selected transmitter may not always have capacity that allows a receiver to use full capacity. For example, even if a user can select an apparatus capable of dealing with the same compression format as a compression format having the highest compression capacity in compression formats that a receiver can deal with, the user may not be able to select this apparatus as a transmitter because the user cannot recognize capacities of all apparatuses connected to the network. If an apparatus capable of dealing with only compression formats having compression capacity lower than the compression capacity of the compression format that the receiver can deal with is selected as a transmitter by the user, a transmission condition is determined to conform to the compression format having the low compression capacity that the transmitter can deal with. Specifically, if the receiver can deal with two image compression formats: JBIG, which is one of the high-efficiency compression formats, and MMR, of which the compression rate is lower than JBIG; and the transmitter can deal with MMR only, the compression format is determined to be MMR common to the receiver and the transmitter.

However, in the method disclosed in Japanese Patent Application Laid-open No. 2002-290647, a transmitter is arbitrarily selected from a plurality of apparatuses connected to a system, and therefore an optimum transmitter cannot be selected by comparing all apparatuses that can be communicated with, and it is not always possible to select a transmitter having capacity that is the same as or closest to capacity that a receiver has.

SUMMARY OF THE INVENTION

It is an object of the present invention to at least partially solve the problems in the conventional technology.

According to an aspect of the present invention, there is provided an image processing apparatus connected to a plurality of transmitters with a facsimile communication function via a network. The image processing apparatus includes: a first acquiring unit that acquires information on respective communication capacities of the transmitters and information on communication capacity of a partner device to be in facsimile communication with a transmitter; and a selecting unit that selects a transmitter having communication capacity that is the same as or closest to the communication capacity of the partner device from the plurality of transmitters. According to another aspect of the present invention, there is provided an image processing system including a first image processing apparatus and a plurality of second image processing apparatuses with a facsimile communication function. The first image processing apparatus includes: an accepting unit that accepts an instruction for facsimile transmission; a reading unit that reads image data subjected to the facsimile transmission; a first acquiring unit that acquires information on communication capacity of a partner device, which is a destination of the facsimile transmission, and information on respective communication capacities of the plurality of second image processing apparatuses; a selecting unit that selects an image processing apparatus having communication capacity that is the same as or closest to the communication capacity of the partner device indicated by the acquired information from the second image processing apparatuses as a transmitter which performs the facsimile transmission; and a facsimile-transmission-request transmitting unit that transmits a request to fax the read image data to the partner device to the selected transmitter. The second image processing apparatuses include: a facsimile-transmission-request receiving unit that receives the request from the first image processing apparatus; and an image-data transmitting unit that faxes the image data to the partner device upon reception of the request.

According to still another aspect of the present invention, there is provided an image processing system including a first image processing apparatus, a plurality of second image processing apparatuses with a facsimile communication function, and a server. The second image processing apparatuses include: a first acquiring unit that acquires information on communication capacity of a partner device and information on respective communication capacities of the other second image processing apparatuses; a selecting unit that selects an image processing apparatus having communication capacity that is the same as or closest to the communication capacity of the partner device indicated by the acquired information from the second image processing apparatuses as a transmitter which performs facsimile transmission; and a partner-device-identifying-information transmitting unit that transmits transmitter identifying information identifying the selected transmitter and partner-device identifying information identifying the partner device to the server. The server includes a storage unit that stores therein the transmitter identifying information and the partner-device identifying information received from the second image processing apparatus in an associated manner. The first image processing apparatus includes: an accepting unit that accepts an instruction for facsimile transmission, the instruction including image data subjected to the fax transmission and the partner-device identifying information identifying the partner device which is a destination of the facsimile transmission; a transmitter-identifying-information-request transmitting unit that transmits the partner-device identifying information and a request for acquisition of the transmitter identifying information associated with the partner-device identifying information to the server; a second receiving unit that receives the transmitter identifying information associated with the partner-device identifying information from the server; and a facsimile-transmission-request transmitting unit that transmits a request for fax transmission of the image data to the transmitter identified by the acquired transmitter identifying information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram showing an example of a table in which communication capacity of a partner device is associated with a fax number of the partner device;

FIG. 7 is a flowchart showing a procedure of a transmitter selecting process performed by the master device in a case where a plurality of slave devices is connected to the image processing system;

FIG. 8 is a diagram showing an example of a priority table;

FIG. 9A is a diagram showing communication capacity of a slave device;

FIG. 9B is a diagram showing communication capacity of another slave device;

FIG. 9C is a diagram showing communication capacity of a partner device;

FIG. 11 is a diagram showing an example of the input value input by a user;

FIG. 12A is a diagram showing an example of communication capacity of a slave device;

FIG. 12B is a diagram showing an example of communication capacity of another slave device;

FIG. 12C is a diagram showing an example of communication capacity of a partner device;

FIG. 13 is a flowchart showing a procedure of a process of updating communication capacity of the partner device performed by the slave device;

DETAILED DESCRIPTION OF THE PREFERRED EMBODIMENTS

Exemplary embodiments of an image processing apparatus and an image processing system according to the present invention are explained in detail below with reference to the accompanying drawings.

First Embodiment

Figure 1:
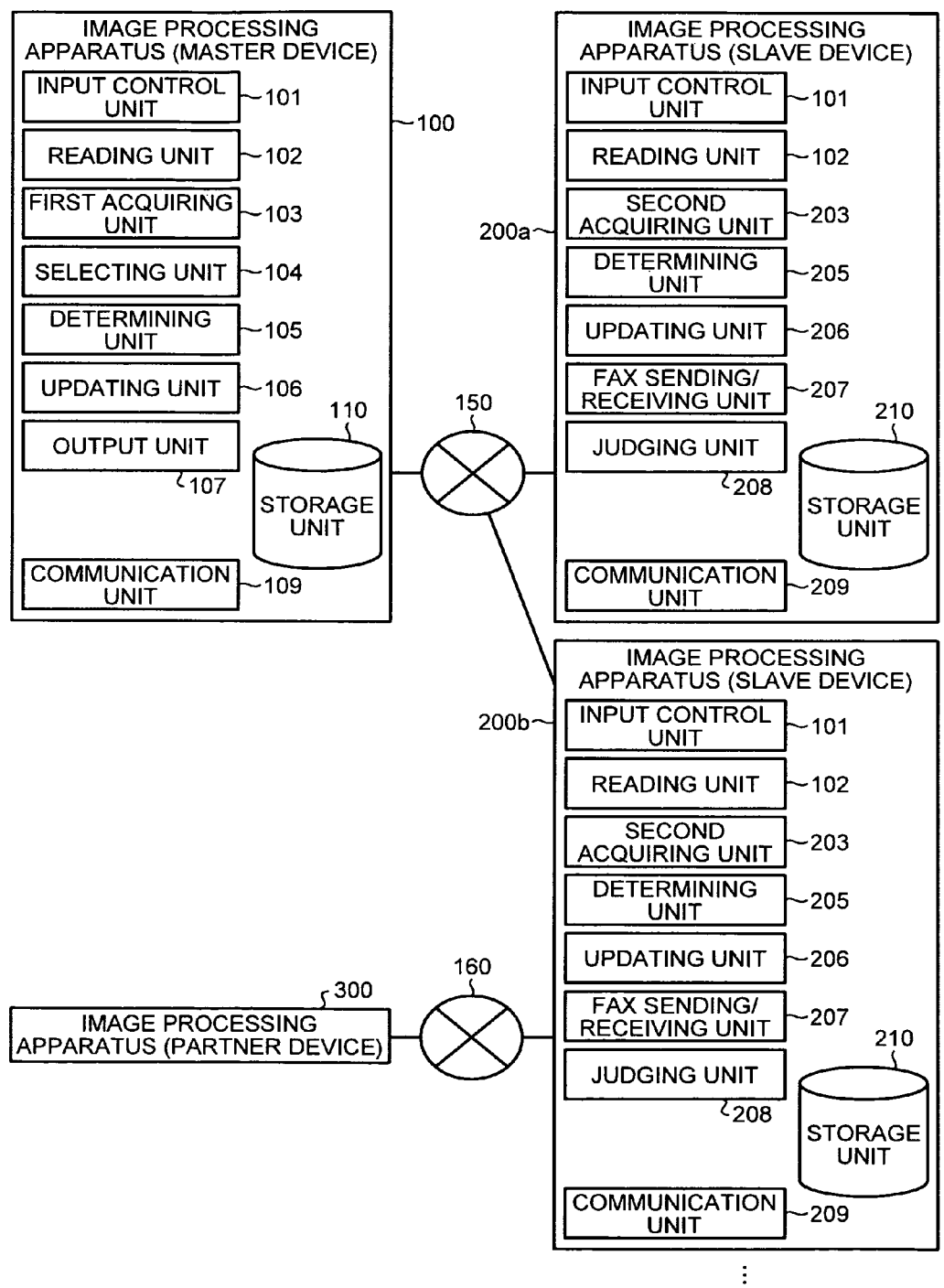
FIG. 1 is a block diagram showing an entire configuration and function of an image processing system according to a first embodiment.

FIG. 1 is a block diagram showing an entire configuration and function of an image processing system according to a first embodiment. As shown in FIG. 1, in the image processing system according to the first embodiment, an image processing apparatus (hereinafter, referred to as a "master device") 100, which accepts an instruction for fax transmission, and image processing apparatuses (hereinafter, referred to as "slave devices") 200a and 200b, which serve as fax transmitters and fax receivers (hereinafter, collectively referred to as "slave device(s) 200" unless otherwise specified), are connected via a network 150 such as a local area network (LAN). The slave device 200b is further connected to an image processing apparatus (hereinafter, referred to as a "partner device") 300, which is the other end of fax communication, via an externally connectable network 160 such as a wide area network (WAN). Incidentally, in FIG. 1, two slave devices 200 are illustrated; however, the number of slave devices is not limited to two. Any device can be used as the master device 100 as long as the device can accept an instruction for fax transmission; any device can be used as the slave device 200 and the partner device 300 as long as the device has a fax communication function.

First, details of the master device 100 are explained. As shown in FIG. 1, the master device 100 mainly includes an input control unit 101, a reading unit 102, a first acquiring unit 103, a selecting unit 104, a determining unit 105, an updating unit 106, an output unit 107, a communication unit 109, and a storage unit 110.

The input control unit 101 accepts input of various information from a user through an operation display unit (not shown). For example, the input control unit 101 has a function as an accepting unit which accepts input of a fax number of a partner device which is a destination of fax transmission, an instruction to initiate reading of an original to be subjected to fax transmission, and an instruction to initiate fax transmission of image data of the read original.

Furthermore, the input control unit 101 has a function as an input accepting unit which accepts, from a user, input of a value representing communication capacity of an item that a device to be selected by the selecting unit 104 as a slave device should have (hereinafter, referred to as an "input value").

The reading unit 102 reads image data of an original to be subjected to fax transmission when the input control unit 101 accepts an instruction to initiate reading of the original.

The first acquiring unit 103 acquires information on communication capacity of a partner device identified by a fax number of a destination when the input control unit 101 accepts an instruction to initiate fax transmission. The communication capacity here means communication capacity for fax transmission, and is composed of a plurality of items. For example, the items composing the communication capacity include a transmission mode, a compression format, transmission speed, per-millimeter/per-inch line density, record length/width, and smoothing, etc.; the information on the communication capacity means concrete values representing communication capacity of these items. The information on the communication capacity of the partner device 300 may be stored in a storage unit 210 of the slave device 200 having a history of communication with the partner device 300. In this case; each time the slave device 200 acquires information on communication capacity from the partner device 300, the storage unit 210 stores therein a fax number of the partner device 300 and a device ID of the slave device 200 being in communication with the partner device 300 in an associated manner. The first acquiring unit 103 acquires the information on the communication capacity of the partner device 300 from the slave device 200 identified by the device ID associated with the fax number of the partner device 300.

Alternatively, as another example, the communication capacity of the partner device 300 may be stored in the respective storage units 210 of all the slave devices 200 connected to the image processing system. In this case, the first acquiring unit 103 acquires the information on the communication capacity of the partner device 300 from any of the slave devices 200. Incidentally, all the slave devices 200 receive the information on the communication capacity of the partner device 300 from the slave device 200 that has been in fax communication with the partner device 300, and then store the information on the communication capacity of the partner device 300 in the respective storage units 210.

Furthermore, as still another example, the information on the communication capacity of the partner device 300 can be stored in the storage unit 110 in association with the fax number of the partner device 300. In this case, the first acquiring unit 103 acquires the information on the communication capacity of the partner device 300 from the storage unit 110. Incidentally, each time the slave device 200 acquires information on communication capacity of the partner device 300, the storage unit 110 receives the information on the communication capacity of the partner device 300 from the slave device 200 that has been in fax communication with the partner device 300 and stores therein the received information on the communication capacity of the partner device 300.

The selecting unit 104 acquires information on communication capacities of all the slave devices 200 connected to the image processing system, and selects one slave device 200 having communication capacity that is the same as or closest to the communication capacity of the partner device 300 indicated by the information acquired by the first acquiring unit 103 from the slave devices 200 as a transmitter which faxes image data to the partner device 300 (hereinafter, referred to as a "transmitter").

The information on the communication capacity of each of the slave devices 200 connected to the image processing system is stored in the storage unit 210 of corresponding one of the slave devices 200 which acquires the information on the communication capacity from the partner device 300. In this case, the selecting unit 104 acquires information on communication capacities of all the slave devices 200 from the respective storage units 210 of the slave devices 200.

Alternatively, as another example, the information on the communication capacities of all the slave devices 200 connected to the image processing system may be stored in the storage unit 110 of the master device 100. In this case, the selecting unit 104 acquires the information on the communication capacities of all the slave devices 200 from the storage unit 110.

Furthermore, as still another example, if a plurality of slave devices having communication capacity that is the same as or closest to the communication capacity of the partner device 300 indicated by the information acquired by the first acquiring unit 103 is connected to the image processing system, the selecting unit 104 selects one from the slave devices according to priority. For example, if a plurality of slave devices having communication capacity that is the same as or closest to the communication capacity of the partner device 300 indicated by the information acquired by the first acquiring unit 103 is connected to the image processing system, the selecting unit 104 selects one from the slave devices according to a priority table in which priority of a plurality of items composing the communication capacity are shown. The items composing the communication capacity here include a transmission mode, a compression format, transmission speed, per-millimeter/per-inch line density, record length/width, and smoothing, etc. The priority table is a table showing priority order for these items. Incidentally, the priority table is stored in the storage unit 110.

Moreover, as still another example, the selecting unit 104 may select a transmitter according to an input value which is input by a user and accepted by the input control unit 101. The input value here means a value of an item composing communication capacity that the slave device 200 to be selected should have. This allows the selecting unit 104 to avoid always selecting a high-performance device in the slave devices 200 connected to the image processing system; therefore, it is possible to achieve efficient communications in the entire image processing system.

The storage unit 110 stores therein a fax number of each of the partner devices 300 and a device ID of a slave device 200 having a history of communication with corresponding one of the partner devices 300 in an associated manner. Furthermore, the storage unit 110 may store therein information on communication capacities of all the slave devices 200 connected to the image processing system. Moreover, the storage unit 110 may store therein a fax number of each of the partner devices 300 and information on communication capacity of corresponding one of the partner devices 300 in an associated manner. Furthermore, the storage unit 110 may store therein the priority table.

When a fax number of a partner device 300 and information on communication capacity of the partner device 300 are stored in the storage unit 110 in an associated manner, if information on communication capacity of the partner device 300 corresponding to the same fax number is newly acquired by the first acquiring unit 103, the determining unit 105 determines whether the newly-acquired information on the communication capacity of the partner device 300 is identical to the information on the communication capacity of the partner device 300 which is stored in the storage unit 110.

When the determining unit 105 determines that the newly-acquired information on the communication capacity is not identical to the information on the communication capacity of the partner device 300 which is stored in the storage unit 110, the updating unit 106 updates the information on the communication capacity of the partner device 300 which is stored in, the storage unit 110 to the newly-acquired information on the communication capacity. Consequently, even if there is any change in communication capacity of the partner device 300 due to replacement or the like, information on the latest communication capacity is stored, and therefore it is possible to select an optimum transmitter.

The output unit 107 outputs image data in accordance with an instruction to output the image data from the input control unit 101. For example, the output unit 107 prints out image data read by the reading unit 102.

The communication unit 109 has a function as a facsimile-transmission requesting unit which transmits a request for facsimile transmission to the slave device 200 selected as the transmitter or the slave device 200 selected at random.

Subsequently, details of the slave device 200 are explained. As shown in FIG. 1, the slave device 200 mainly includes the input control unit 101, the reading unit 102, a second acquiring unit 203, a determining unit 205, an updating unit 206, a fax sending/receiving unit 207, a judging unit 208, a communication unit 209, and the storage unit 210. Incidentally, the input control unit 101 and the reading unit 102 have the same configuration and function as the units having the same reference numerals that the master device 100 includes.

The fax sending/receiving unit 207 faxes image data to the partner device 300 via the communication unit 209, or receives faxed image data from the partner device 300. In the fax communication, the fax sending/receiving unit 207 performs fax transmission or fax reception according to a communication condition decided in negotiation.

The negotiation here means a process of deciding a communication condition for fax communication. The communication condition here means a condition that is used in fax communication by both the transmitter and the receiver, and is composed of a plurality of items that are the same as those of the communication capacity. For example, regarding respective items composing the communication condition, the fax sending/receiving unit 207 decides on the highest-level form or value in forms or values common to the transmitter and the receiver as a communication condition.

Incidentally, the items of the communication condition decided on the basis of only communication capacities of the transmitter and the receiver are the transmission mode, the compression format, and transmission speed. As for the other items such as line density and record length, a set value in image data to be transmitted is decided as the communication condition even if there is a value common to communication capacities of the transmitter and the receiver other than the set value.

Figure 2:
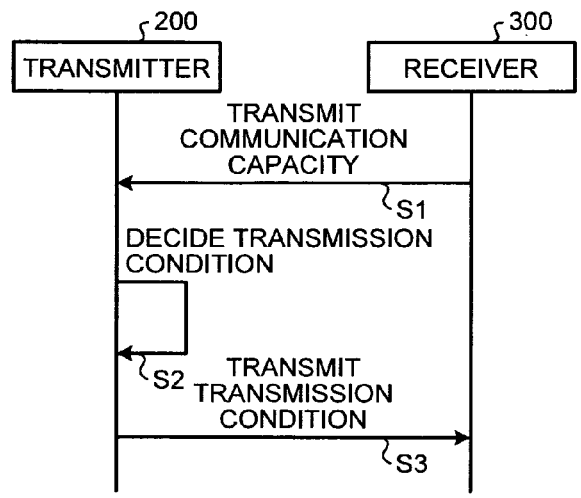
FIG. 2 is a sequence diagram showing a procedure of negotiation performed by a slave device serving as a transmitter.

FIG. 2 is a sequence diagram showing a procedure of negotiation performed by the slave device 200 serving as the transmitter. FIG. 2 shows a case where the slave device 200 serving as the transmitter faxes image data to the partner device 300 which is the receiver. When the slave device 200 which is the transmitter is in communication with the partner device 300 which is the receiver, the partner device 300 which is the receiver transmits information on communication capacity to the slave device 200 which is the transmitter (Step S1).

The slave device 200 which is the transmitter compares the communication capacity of the partner device 300 indicated by the information received from the partner device 300 which is the receiver with communication capacity of the slave device 200, and decides on, regarding respective items composing the communication capacities, the highest-level form or value in forms or values common to the transmitter and the receiver as a communication condition (Step S2). The slave device 200 which is the transmitter transmits the decided communication condition to the partner device 300 which is the receiver (Step S3).

Figure 3:
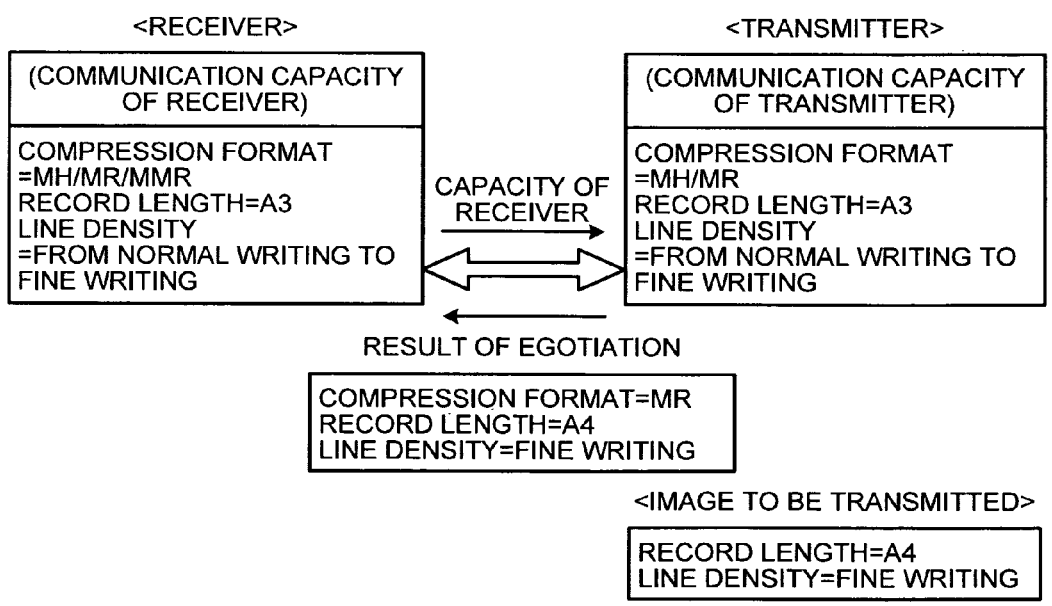
FIG. 3 is a diagram showing a concrete example of how a receiver receives a result of the negotiation from the transmitter.

FIG. 3 is a diagram showing a concrete example of how a receiver receives a result of negotiation from a transmitter. As shown in FIG. 3, upon communication from the transmitter, the receiver transmits information on communication capacity of the receiver to the transmitter. Here, it is shown that the receiver has the communication capacity of "MH/MR/MMR" regarding compression formats, "A3" regarding record length, and "from normal writing to fine writing" regarding line density. On the other hand, it is shown that the transmitter has the communication capacity of "MH/MR" regarding compression formats, "A3" regarding record length, and "from normal, writing to fine writing" regarding line density. Furthermore, it is shown that image data to be transmitted has properties of "A4" regarding record length and "fine writing" regarding line density. Incidentally, a compression rate of the compression format. MMR is the highest, a compression rate of MR is the second highest, and a compression rate of MH is the lowest.

Based on these conditions, the transmitter decides on the compression format MR having the highest compression rate in compression formats common to the communication capacities of the transmitter and the receiver as a communication condition. Furthermore, as for the record length, although the highest value in forms common to the communication capacities of the receiver and the transmitter is A3, the transmitter decides on A4 as a communication condition because the set value in the image data to be transmitted is A4. Moreover, as for the line density, the transmitter decides on fine writing, which is common to the transmitter and the receiver and is the set value in the image data to be transmitted, as a communication condition. The receiver receives a result of negotiation in which these values are decided as communication conditions from the transmitter.

In a case where the fax sending/receiving unit 207 receives fax from a partner device 300, the judging unit 208 judges communication capacity of the partner device 300 from a result of negotiation received via the communication unit 209. For example, the judging unit 208 compares a result of negotiation with communication capacity of the slave device 200; the judging unit 208 judges that a form or value indicated in the result of negotiation is the communication capacity of the partner device 300 if a level of the form or value is lower than that of the communication capacity of the slave device 200 or is a maximum level of settable forms or values.

The second acquiring unit 203 acquires information on communication capacity of the partner device 300, and stores the acquired information on the communication capacity in the storage unit 210. In a case where the fax sending/receiving unit 207 faxes image data to a partner device 300, the second acquiring unit 203 acquires information on communication capacity of the partner device 300 from the partner device 300 via the communication unit 209 as shown in FIG. 2. On the other hand, in a case where the fax sending/receiving unit 207 receives fax from a partner device 300, the second acquiring unit 203 acquires information on judged communication capacity of the partner device 300 from the judging unit 208.

Furthermore, as another example, even in a case where the fax sending/receiving unit 207 receives fax from the partner device 300, the second acquiring unit 203 may acquire information on communication capacity of the partner device 300 via the communication unit 209 according to a special protocol. As described above, in communication with the partner device 300 according to a standard protocol, in the case where the fax sending/receiving unit 207 receives fax, the judging unit 208 has to judge communication capacity of the partner device 300 from a result of negotiation. However, in this example, even in the case where the fax sending/receiving unit 207 receives fax, information on communication capacity of the partner device 300 can be acquired directly from the partner device 300 by using the special protocol.

Incidentally, the second acquiring unit 203 may be configured to acquire information on communication capacity of a partner device 300 according to the special protocol only if the second acquiring unit 203 transmits a request to transmit information on communication capacity of the partner device 300 to the partner device 300. This makes it possible to avoid unnecessary communication in a case where information on communication capacity of the partner device 300 is not required.

The storage unit 210 stores therein information on communication capacity of the slave device 200 including the same storage unit 210. Furthermore, the storage unit 210 stores therein information on communication capacity of a partner device 300 acquired by the second acquiring unit 203 and a fax number of the partner device 300 in an associated manner. As another example, the storage unit 210 can store therein information on communication capacity of the partner device 300 acquired by communications between the partner devices 300 and all the slave devices 200 connected to the image processing system.

When a fax number of a partner device 300 and information on communication capacity of the partner device 300 are stored in the storage unit 210 in an associated manner, if information on communication capacity of the partner device 300 corresponding to the same fax number is newly acquired by the second acquiring unit 203, the determining unit 205 determines whether the newly-acquired information on the communication capacity of the partner device 300 is identical to the information on the communication capacity of the partner device 300 which is stored in the storage unit 210.

When the determining unit 205 determines that the newly-acquired information on the communication capacity is not identical to the information on the communication capacity of the partner device 300 which is stored in the storage unit 210, the updating unit 206 updates the information on the communication capacity of the partner device 300 which is stored in the storage unit 210 to the newly-acquired information on the communication capacity. Consequently, even if there is any change in communication capacity of the partner device 300 due to replacement or the like, information on the latest communication capacity is stored, and therefore it is possible to select an optimum transmitter.

The communication unit 209 has a function as an image-data transmitting unit which transmits image data to a partner device 300 in accordance with an instruction from the fax sending/receiving unit 207. Furthermore, the communication unit 209 has a function as a communication-capacity-request transmitting unit which transmits a request to transmit information on communication capacity of the partner device 300 to the partner device 300.

Moreover, the communication unit 209 has a function as a facsimile-transmission-request receiving unit which receives a request for fax transmission from the master device 100. Furthermore, the communication unit 209 has a function as a communication-condition receiving unit which receives a communication condition from a partner device 300 which is a transmitter.

Moreover, as another example, the communication unit 209 has a function as a third transmitting unit which communicates with the partner device 300 according to the special protocol capable of acquiring information on communication capacity of the partner device 300.

Figure 4:
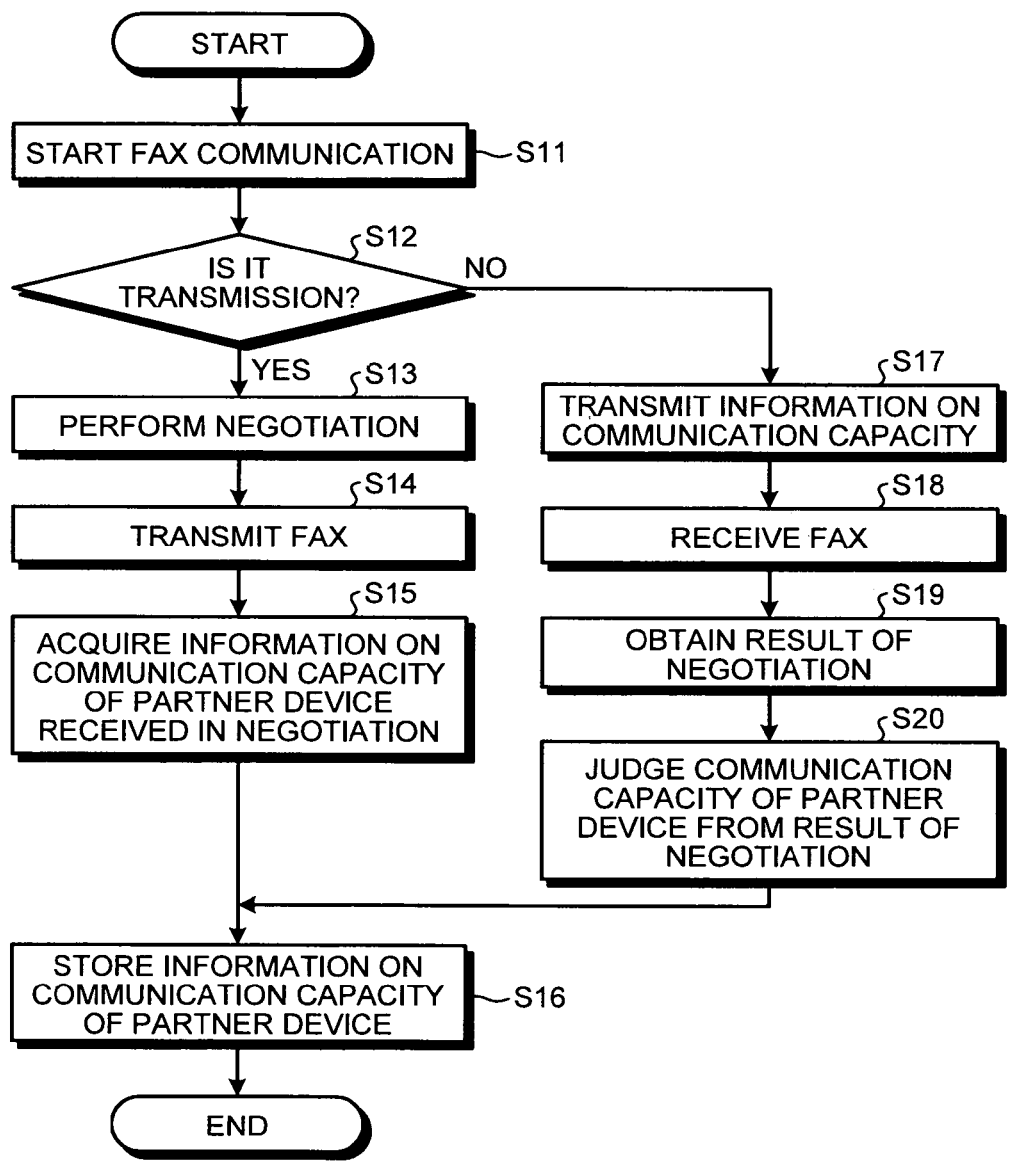
FIG. 4 is a flowchart showing a procedure of a process of acquiring communication capacity of a partner device performed by the slave device.

Subsequently, a procedure of a process of acquiring information on communication capacity of the partner device 300 (hereinafter, referred to as a "communication-capacity acquiring process") performed by the slave device 200 configured as above is explained. FIG. 4 is a flowchart showing the procedure of the communication-capacity acquiring process performed by the slave device 200.

The slave device 200 starts fax communication with the partner device 300 via the communication unit 209 in accordance with an instruction from the master device 100 (Step S11). The fax sending/receiving unit 207 determines whether the fax communication with the partner device 300 is fax transmission (Step S12). When determining that the fax communication with the partner device 300 is fax transmission (YES at Step S12), the fax sending/receiving unit 207 performs negotiation with the partner device 300 (Step S13). The second acquiring unit 203 faxes image data to the partner device 300 according to a communication condition decided in the negotiation performed by the fax sending/receiving unit 207 (Step S14).

The second acquiring unit 203 acquires information on communication capacity of the partner device 300 received in the negotiation from the fax sending/receiving unit 207 (Step S15). The second acquiring unit 203 stores the acquired information on the communication capacity of the partner device 300 in the storage unit 210 in a manner associated with a fax number of the partner device 300 (Step S16).

At Step S12, when determining that the fax communication with the partner device 300 is fax reception (NO at Step S12), the fax sending/receiving unit 207 transmits information on communication capacity of the slave device 200 including the same fax sending/receiving unit 207 to the partner device 300 (Step S17). The fax sending/receiving unit 207 receives a result of negotiation from the partner device 300, and receives faxed image data from the partner device 300 according to a communication condition indicated in the result of negotiation (Step S18). The judging unit 208 obtains the result of negotiation (Step S19). The judging unit 208 judges communication capacity of the partner device 300 from the obtained result of negotiation (Step S20).

FIG. 5 shows an example of a table in which information on communication capacity of a partner device 300 is associated with a fax number of the partner device 300. As shown in FIG. 5, a number starting with "03" is registered as a fax number of the partner device 300. Furthermore, concrete values of communication capacity of the partner device 300 are associated with the fax number of the partner device 300. Here, values, such as "ECM" as a transmission mode and "MH/MR/MMR" as compression formats, are indicated.

Figure 6:
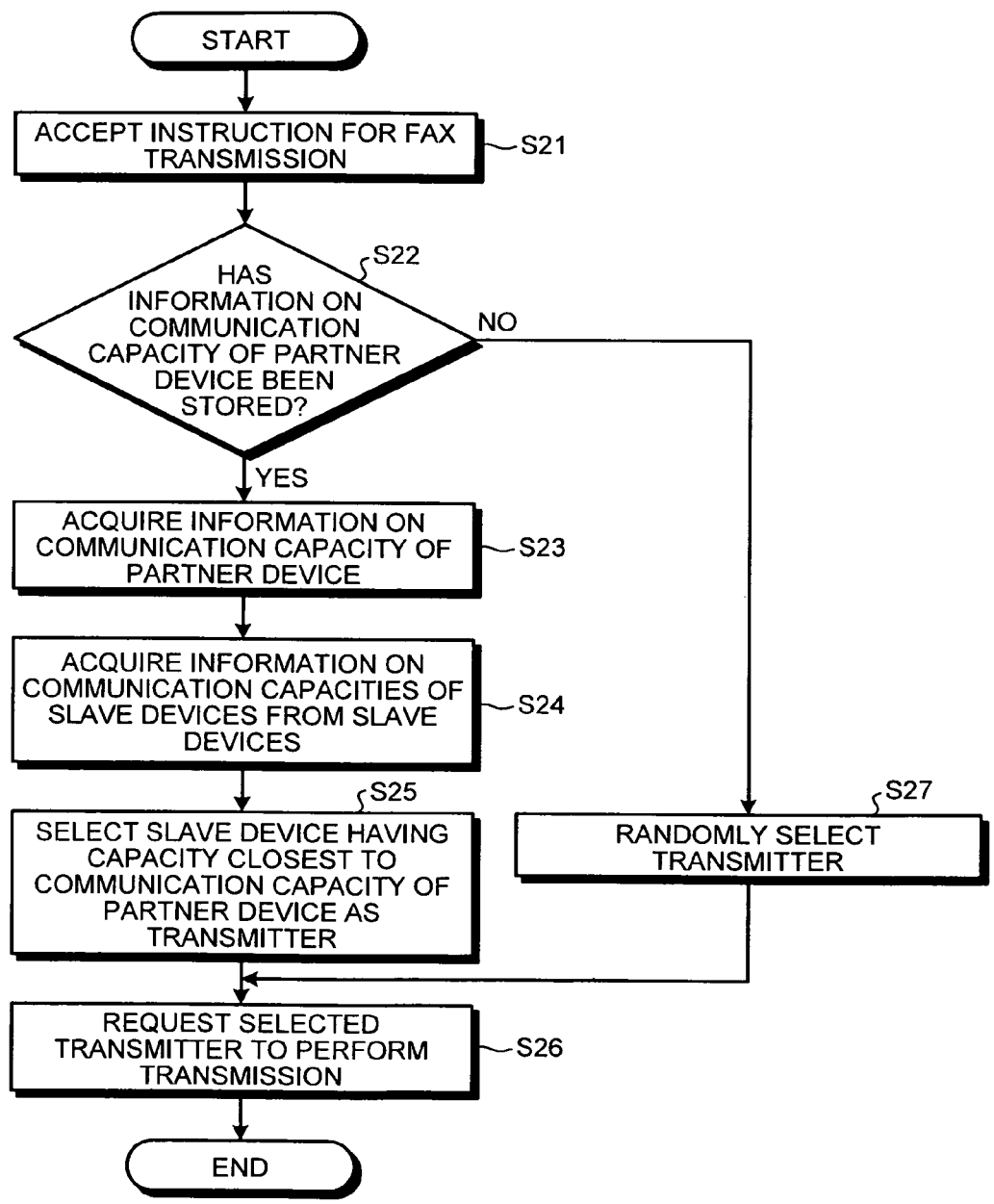
FIG. 6 is a flowchart showing a procedure of a transmitter selecting process performed by a master device.

Subsequently, a procedure of a process of selecting the transmitter (hereinafter, referred to as a "transmitter selecting process") performed by the master device 100 is explained. FIG. 6 is a flowchart showing the procedure of the transmitter selecting process performed by the master device 100.

The input control unit 101 accepts a fax number of a destination of fax transmission and an instruction to initiate fax transmission from a user (Step S21). The first acquiring unit 103 checks whether information on communication capacity corresponding to the fax number of a partner device 300 is stored in the storage unit 110 (Step S22).

When the first acquiring unit 103 confirms that information on communication capacity corresponding to the fax number of a partner device 300 is stored in the storage unit 110 (YES at Step S22), the first acquiring unit 103 acquires the information on the communication capacity of the partner device 300 from the storage unit 110 (Step S23). The selecting unit 104 acquires information on respective communication capacities of slave devices 200 from the slave devices 200 (Step S24). The selecting unit 104 selects one of the slave devices 200 having the capacity closest to the communication capacity of the partner device 300 as the transmitter (Step S25).

On the other hand, when the first acquiring unit 103 does not confirm that information on communication capacity corresponding to the fax number of the partner device 300 is stored in the storage unit 110 (NO at Step S22), the transmitter is randomly selected from the slave devices 200 connected to the image processing system (Step S27). The communication unit 109 requests the slave device 200 selected as the transmitter to perform fax transmission (Step S26).

Subsequently, a transmitter selecting process performed by the master device 100 in a case where a plurality of slave devices 200 having communication capacity of which level is the same as or closest to that of the communication capacity of the partner device 300 indicated by the information acquired by the first acquiring unit 103 is connected to the image processing system is explained. FIG. 7 is a flowchart showing a procedure of the transmitter selecting process performed by the master device 100 in the case where the plurality of slave devices 200 is connected to the image processing system.

Processes at Steps S31 to S34 and Steps S37 to S38 are identical to the processes at Steps S21 to S24 and Steps S26 to S27 of the transmitter selecting process shown in FIG. 6.

At Step S35, the selecting unit 104 determines whether a plurality of slave devices 200 having capacity closest to the communication capacity of the partner device 300 is connected to the image processing system (Step S35). When determining that a plurality of slave devices 200 having capacity closest to the communication capacity of the partner device 300 is connected to the image processing system (YES at Step S35), the selecting unit 104 compares communication capacity of each of the slave devices 200 with the communication capacity of the partner device 300 regarding respective items in decreasing order of the priority shown in the priority table, and selects one of the slave devices 200 closest to the communication capacity of the partner device 300 as the transmitter (Step S36).

FIG. 8 is a diagram showing an example of the priority table. As shown in FIG. 8, the storage unit 110 stores therein the priority table in which items composing communication capacity are associated with priority. In this example, the priority table shows that a priority of the compression format is 2 (i.e., the compression format has the second highest priority) and a priority of the line density is 1 (i.e., the line density has the highest priority). FIG. 9A is a diagram showing communication capacity of the slave device 200a; FIG. 9B is a diagram showing communication capacity of the slave device 200b. FIG. 9C is a diagram showing communication capacity of the partner device 300. In comparison between FIGS. 9A and 9C, the slave device 200a has JBIG that is the highest compression format in the communication capacity of the partner device 300. Furthermore, in comparison between FIGS. 9B and 9C, the slave device 200b has value of a per-millimeter/per-inch line density of 200×200 dpi that is the same as that in the communication capacity of the partner device 300.

In this manner, here, a plurality of the slave devices 200 having capacity closest to the communication capacity of the partner device 300 is connected to the image processing system. In this case, the selecting unit 104 places priority on the line density having a higher priority than the compression format with reference to the priority table shown in FIG. 8, and selects the slave device 200b as the transmitter.

Returning to FIG. 7, the communication unit 109 requests the transmitter selected by the selecting unit 104 to perform fax transmission (Step S37).

Figure 10:
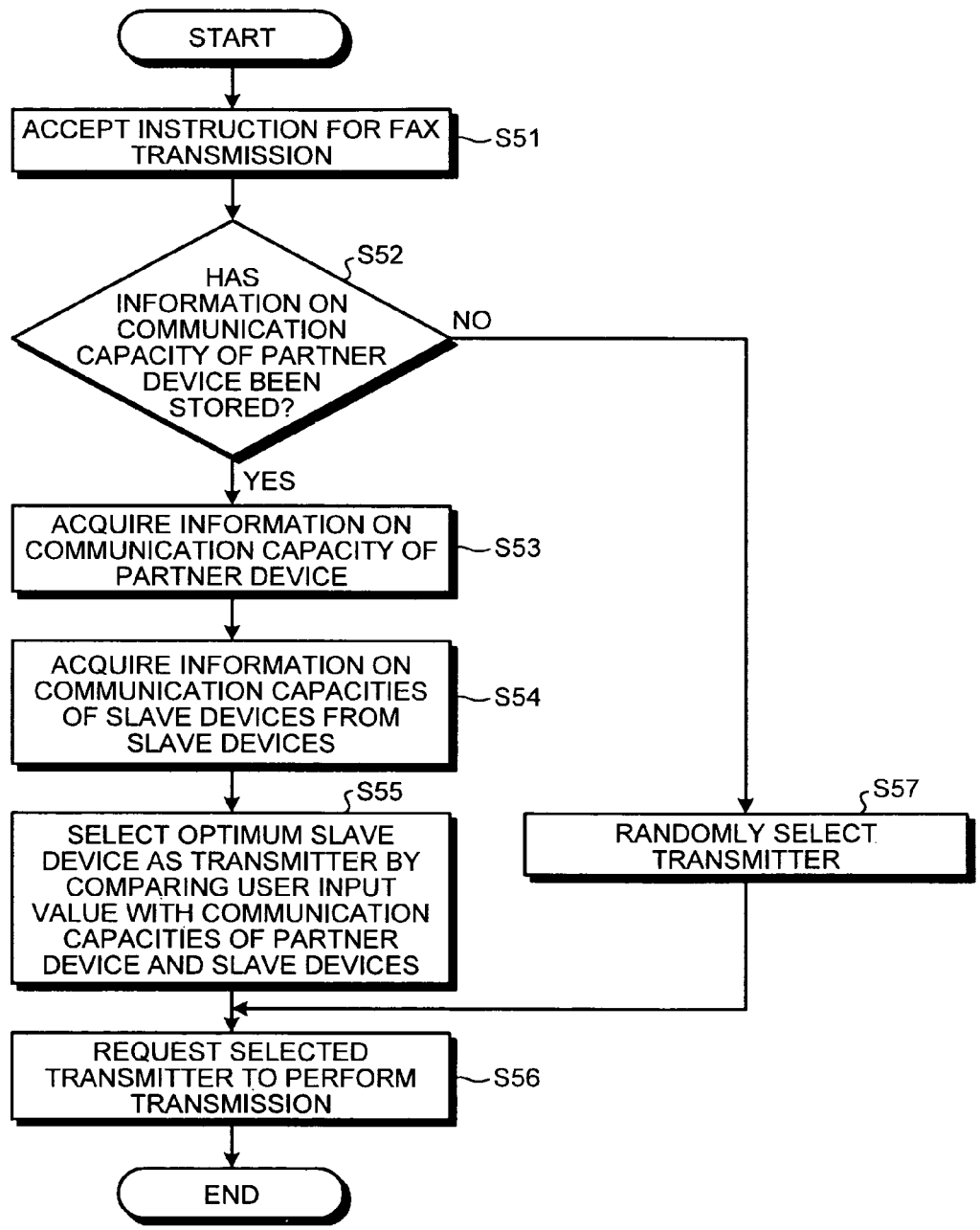
FIG. 10 is a flowchart showing a procedure of a transmitter selecting process performed by the master device in a case where an input value is set.

Subsequently, a transmitter selecting process performed by the master device 100 in a case where the input value is set is explained. FIG. 10 is a flowchart showing a procedure of the transmitter selecting process performed by the master device 100 in the case where the input value is set.

Processes at Steps S51 to S54 and Steps S56 to S57 are identical to the processes at Steps S21 to S24 and Steps S26 to S27 of the transmitter selecting process shown in FIG. 6.

At Step S55, the selecting unit 104 selects the optimum slave device 200 as the transmitter by comparing the input value input by a user with the communication capacities of the partner device 300 and the slave devices 200 (Step S55). For example, the selecting unit 104 first identifies a plurality of devices having a form or value of which level is the same as or closest to that of the communication capacity of the partner device 300 from the slave devices 200 connected to the image processing system. Then, the selecting unit 104 selects a device meeting the input value from the user from the identified devices as the transmitter.

FIG. 11 is a diagram showing an example of the input value from the user. As shown in FIG. 11, the storage unit 110 stores therein the per-millimeter/per-inch line density of "up to 200×100 dpi" as the input value from the user. FIG. 12A is a diagram showing an example of communication capacity of the slave device 200a; FIG. 12B is a diagram showing an example of communication capacity of the slave device 200b; FIG. 12C is a diagram showing an example of communication capacity of the partner device 300. In comparison between FIGS. 12A, 12B, and 12C, a compression format common to the slave device 200a, the slave device 200b, and the partner device 300 is JBIG. Furthermore, focusing on a value of the per-millimeter/per-inch line density of the partner device 300, the slave device 200b has the highest value. However, referring to the input value from the user shown in FIG. 11, "up to 200×200 dpi" is set in the per-millimeter/per-inch line density. Therefore, the selecting unit 104 selects the slave device 200a as the transmitter.

Returning to FIG. 10, the communication unit 109 requests the transmitter selected by the selecting unit 104 to perform fax transmission (Step S56).

Subsequently, a procedure of a process of updating information on communication capacity of the partner device 300 performed by the slave device 200 is explained. FIG. 13 is a flowchart showing the procedure of the process of updating information on communication capacity of the partner device 300 performed by the slave device 200.

Processes at Steps S61 to S69 are identical to the processes at Steps S11 to S20 of the communication-capacity acquiring process shown in FIG. 4.

At Step S70, the storage unit 210 checks whether information on communication capacity of the partner device 300 that is the same as the partner device 300 of which information on the communication capacity is acquired by the second acquiring unit 203 is stored in the storage unit 210 (Step S70).

When the storage unit 210 confirms that information on communication capacity of the same partner device 300 is stored in the storage unit 210 (YES at Step S70), the storage unit 210 checks whether the acquired information on the communication capacity, is different from the stored information on the communication capacity (Step S71). For example, the storage unit 210 checks whether a fax number that is the same as that of the partner device 300 acquired by the second acquiring unit 203 is stored in the storage unit 210 (Step S70). When the storage unit 210 confirms that the same fax number is stored in the storage unit 210 (YES at Step S70), the storage unit 210 checks whether the information on the communication capacity acquired by the second acquiring unit 203 is different from the information on the communication capacity associated with the fax number.

When the storage unit 210 confirms that the acquired information on the communication capacity is different from the stored information on the communication capacity (YES at Step S71), the storage unit 210 updates the stored information on the communication capacity to the acquired information on the communication capacity (Step S72). On the other hand, when the storage unit 210 does not confirm that the same fax number is stored in the storage unit 210 (NO at Step S70), or when the storage unit 210 confirms that the acquired information on the communication capacity is identical to the stored information on the communication capacity (NO at Step S71), the storage unit 210 does not update the stored information on the communication capacity, and terminates the process.

Incidentally, here, the slave device 200 performs the updating process; however, in a case where the master device 100 stores information on communication capacity of the partner device 300 in the storage unit 110, the master device 100 may perform the updating process.

Figure 14:
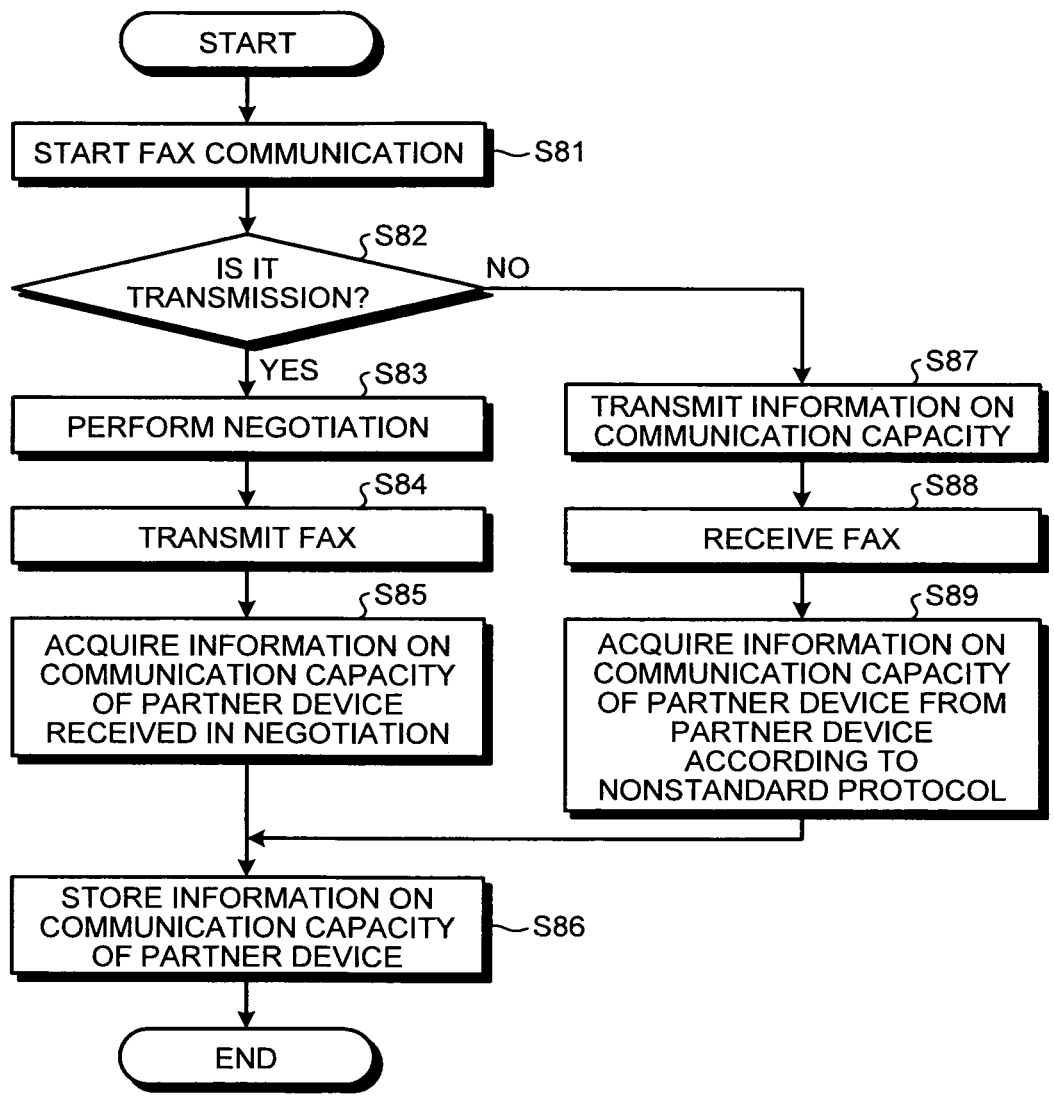
FIG. 14 is a flowchart showing a procedure of a communication-capacity acquiring process performed by the slave device.

Subsequently, a procedure of a communication-capacity acquiring process performed by the slave device 200 serving as the receiver is explained. FIG. 14 is a flowchart showing the procedure of the communication-capacity acquiring process performed by the slave device 200.

Processes at Steps S81 to S88 are identical to the processes at Steps S11 to S18 of the communication-capacity acquiring process shown in FIG. 4.

At Step S89, the second acquiring unit 203 acquires information on communication capacity of the partner device 300 from the partner device 300 via the communication unit 209 according to the special nonstandard protocol (Step S89). The second acquiring unit 203 stores the information on the communication capacity of the partner device 300 acquired at Step S89 and the information on the communication capacity of the partner device 300 acquired at Step S85 in the storage unit 210 (Step S86).

Figure 15:
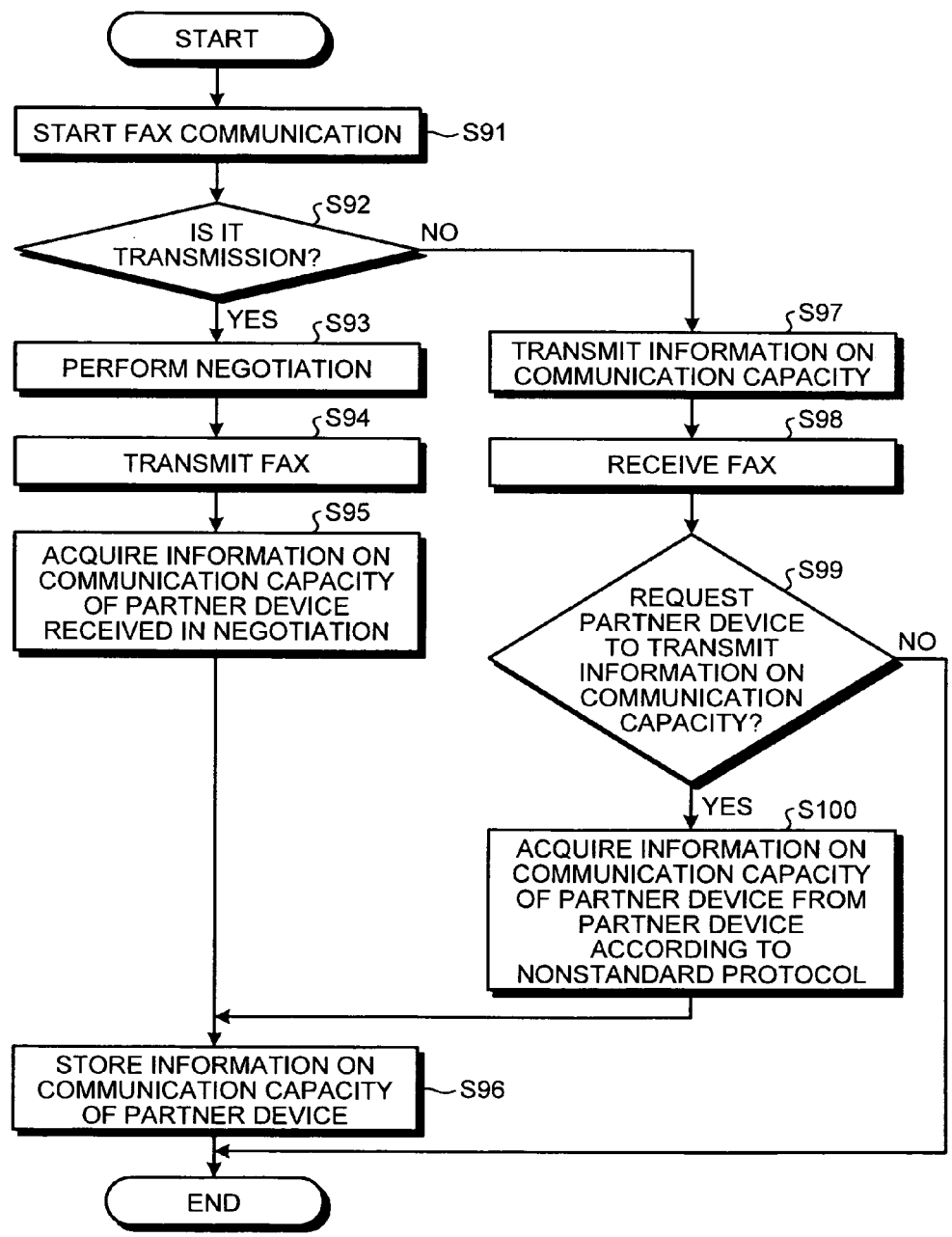
FIG. 15 is a flowchart showing a procedure of another example of the communication-capacity acquiring process performed by the slave device.

Subsequently, another example of the communication-capacity acquiring process performed by the slave device 200 serving as the receiver is explained. FIG. 15 is a flowchart showing a procedure of another example of the communication-capacity acquiring process performed by the slave device 200.

Processes at Steps S91 to S98 are identical to the processes at Steps S81 to S88 of the communication-capacity acquiring process shown in FIG. 14.

At Step S99, the second acquiring unit 203 determines whether to request the partner device 300 to transmit information on communication capacity of the partner device 300 (Step S99). For example, the second acquiring unit 203 may be configured not to request the partner device 300 to transmit information on communication capacity of the partner device 300 if fax transmission to the same partner device 300 was performed within a predetermined time before.

When the second acquiring unit 203 requests the partner device 300 to transmit information on communication capacity of the partner device 300 (YES at Step S99), the second acquiring unit 203 receives and acquires information on communication capacity of the partner device 300 from the partner device 300 according to the special nonstandard protocol (Step S100). On the other hand, when the second acquiring unit 203 does not request the partner device 300 to transmit information on communication capacity of the partner device 300 (NO at Step S99), the second acquiring unit 203 does not acquire information on communication capacity of the partner device 300, and terminates the process.

The second acquiring unit 203 stores the information on the communication capacity of the partner device 300 acquired at Step S100 and the information on the communication capacity of the partner device 300 acquired at Step S95 in the storage unit 210 (Step S96).

In this manner, according to the present embodiment, the master device 100 acquires information on communication capacity that the partner device 300 has and information on communication capacities of slave devices 200 connected to the image processing system, and therefore can select the transmitter that is most suitable for the information on the communication capacity of the partner device 300.

Furthermore, in this manner, according to the present embodiment, with each communication of information on communication capacity of the partner device 300, whether the information on the communication capacity is identical to the stored information on the communication capacity of the partner device 300 is checked; therefore, even if there is a change in communication capacity of the partner device 300, the stored information on the communication capacity of the partner device 300 is updated to information on the latest communication capacity, so it is possible to always select the transmitter that is most suitable for the communication capacity of the partner device 300.

Second Embodiment

In the image processing system according to the first embodiment, the master device selects the most suitable slave device for communication capacity of the partner device as the transmitter. On the other hand, in an image processing system according to a second embodiment, selection of the most suitable slave device for communication capacity of the partner device is performed by the slave device.

Figure 16:
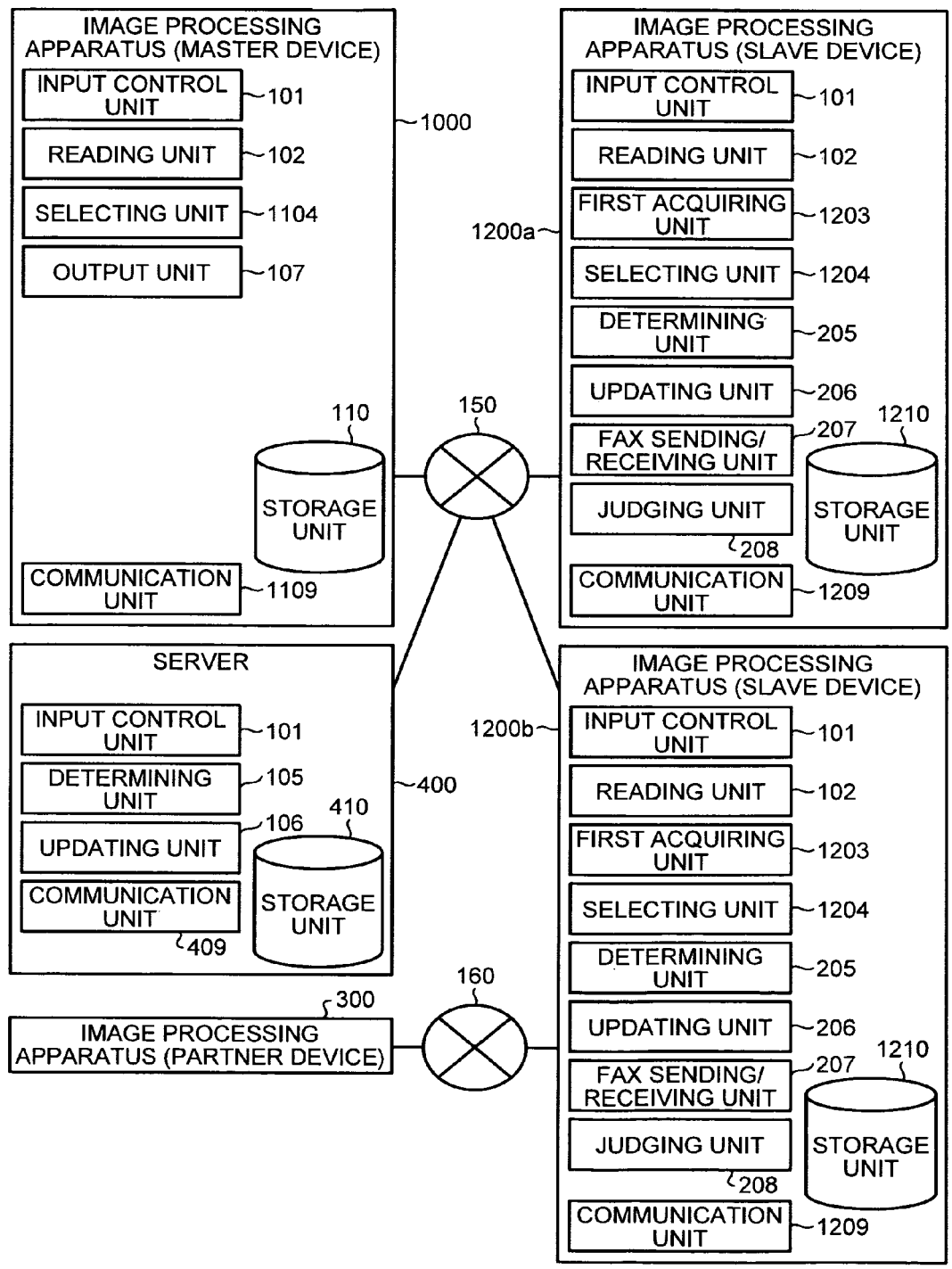
FIG. 16 is a block diagram showing an entire configuration and function of an image processing system according to a second embodiment.

FIG. 16 is a block diagram showing an entire configuration and function of the image processing system according to the second embodiment. As shown in FIG. 16, in the image processing system according to the second embodiment, a master device 1000, slave devices 1200a and 1200b (hereinafter, collectively referred to as "slave device(s) 1200" unless otherwise specified), and a server 400 are connected via the network 150. In the same manner as in the first embodiment, the slave device 1200b is further connected to the partner device 300 via the network 160.

First, details of the slave device 1200 are explained. As shown in FIG. 16, the slave device 1200 mainly includes the input control unit 101, the reading unit 102, a first acquiring unit 1203, a selecting unit 1204, the determining unit 205, the updating unit 206, the fax sending/receiving unit 207, the judging unit 208, a communication unit 1209, and a storage unit 1210. The units other than the second acquiring unit 1203, the selecting unit 1204, and the communication unit 1209 have the same function and configuration as those in the first embodiment.

The first acquiring unit 1203 acquires information on communication capacity of a partner device 300 and information on communication capacities of all the slave devices 1200 connected to the image processing system. For example, the first acquiring unit 1203 acquires information on communication capacity of a partner device 300 upon reception of a request for fax transmission from the master device 1000.

The selecting unit 1204 selects the slave device 1200 having communication capacity of which level is the same as or closest to that of the communication capacity of the partner device 300 indicated by the acquired information as the transmitter. As another example, the selecting unit 1204 selects a plurality of slave devices 1200 having communication capacity that is the same as or close to the communication capacity of the partner device 300, and determines order of the selected plurality of slave devices 1200 from closest to farthest in communication capacity from the partner device 300 (hereinafter, referred to as a "selecting order").

The communication unit 1209 has a function as a facsimile-transmission-request receiving unit which receives a request for fax transmission including a fax number of the partner device 300 and image data from the master device 1000.

Furthermore, the communication unit 1209 has a function as a transmitter-identifying-information transmitting unit which transmits a device ID of the transmitter selected by the selecting unit 1204 and the fax number of the partner device 300 to the server 400. Moreover, the communication unit 1209 has a function as a communication-capacity receiving unit which receives information on communication capacities of all the slave devices 1200 connected to the image processing system from the slave devices 1200.

Subsequently, details of the server 400 are explained. As shown in FIG. 16, the server 400 mainly includes the input control unit 101, the determining unit 105, the updating unit 106, a communication unit 409, and a storage unit 410. Incidentally, the units other than the communication unit 409 and the storage unit 410 have the same function and configuration as the units having the same reference numerals in the first embodiment.

The communication unit 409 receives a fax number of the partner device 300 and a device ID of a slave device 1200 selected as a transmitter from the slave device 1200. Furthermore, the communication unit 409 receives a selecting order determined by the selecting unit 1204 from the slave device 1200.

The storage unit 410 stores therein the fax number of the partner device 300 and a device ID of the slave device 1200 selected as the transmitter, which are received from the slave device 1200, in an associated manner.

As another example, the storage unit 410 may store therein the selecting order received from the slave device 1200 in addition to the fax number of the partner device 300 and the device ID of the slave device 1200 selected as the transmitter in an associated manner.

Subsequently, details of the master device 1000 are explained. As shown in FIG. 16, the master device 1000 mainly includes the input control unit 101, the reading unit 102, a selecting unit 1104, the output unit 107, a communication unit 1109, and the storage unit 110. Incidentally, the units other than the selecting unit 1104 have the same function and configuration as the units having the same reference numerals in the first embodiment.

When the input control unit 101 accepts an instruction for initiation of fax transmission including a fax destination number and image data, the selecting unit 1103 acquires a device ID of the transmitter associated with the partner device 300 identified by the fax number from the server 400, and selects the slave device 1200 identified by the acquired device ID as the transmitter.

The communication unit 1109 has a function as a transmitter-identifying-information-request transmitting unit which transmits a request for transmission of the device ID of the transmitter associated with the partner device 300 identified by the fax number to the server 400.

Figure 17:
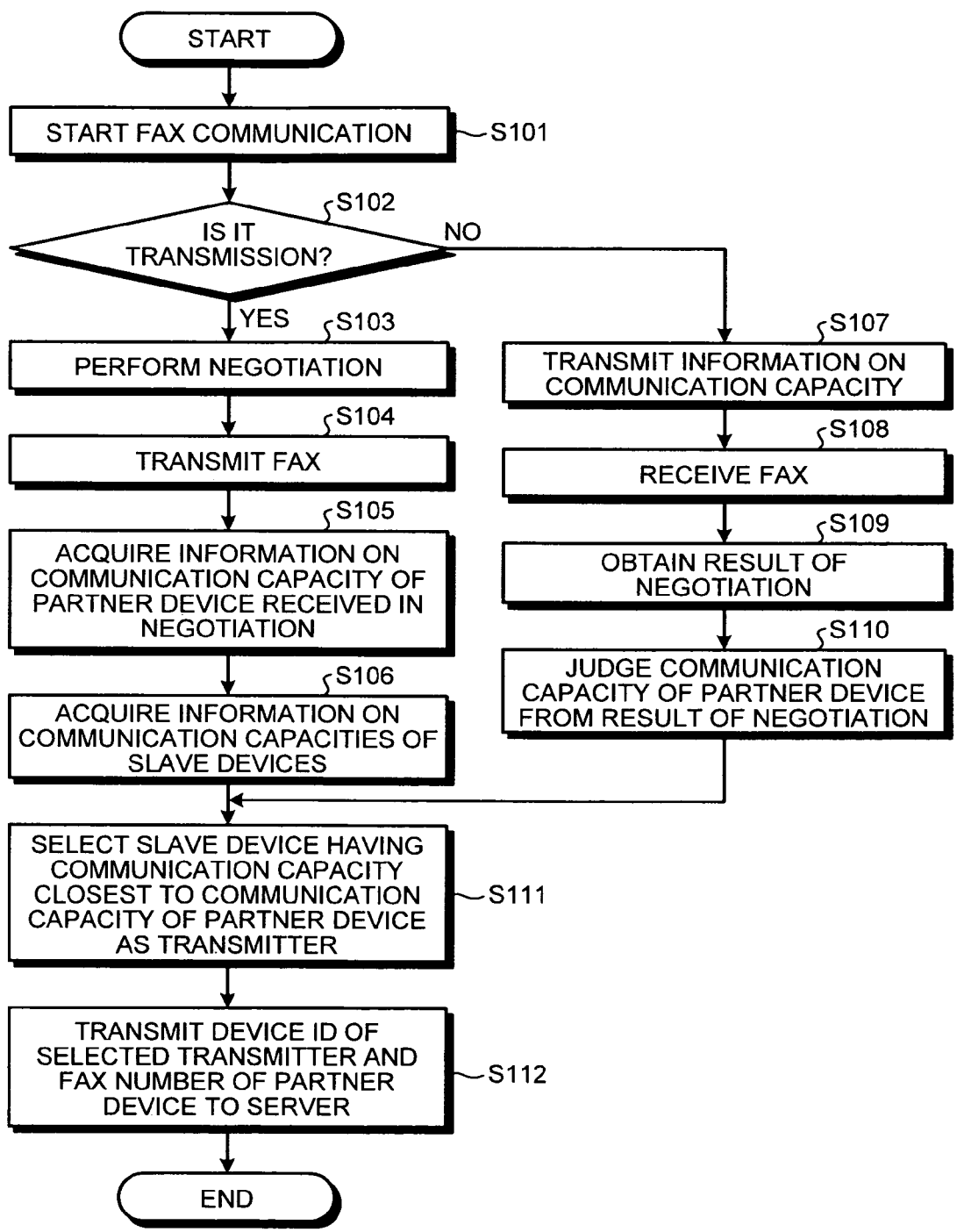
FIG. 17 is a flowchart showing a procedure of a transmitter selecting process performed by a slave device.

Subsequently, a procedure of a transmitter selecting process performed by the slave device 1200 configured as above is explained. FIG. 17 is a flowchart showing the procedure of the transmitter selecting process performed by the slave device 1200.

Processes at Steps S101 to S110 are identical to Steps S11 to S15 and S17 to S20 of the communication-capacity acquiring process shown in FIG. 4.

At Step S106, the first acquiring unit 1203 acquires information on communication capacities of all the slave devices 1200 (Step S106). The selecting unit 1204 selects one of the slave devices 1200 having the closest communication capacity to the communication capacity of the partner device 300 as the transmitter (Step S111). Here, the selecting unit 1204 receives information on respective communication capacities of all the slave devices 1200 connected to the image processing system from the respective slave devices 1200, and selects the transmitter by comparing the received information on the communication capacities of the slave devices 1200 with the information on the communication capacity of the partner device 300 acquired from the master device 1000.

The communication unit 1209 transmits a device ID of the transmitter selected by the selecting unit 1204 and a fax number of the partner device 300 to the server 400 (Step S112).

Figure 18:
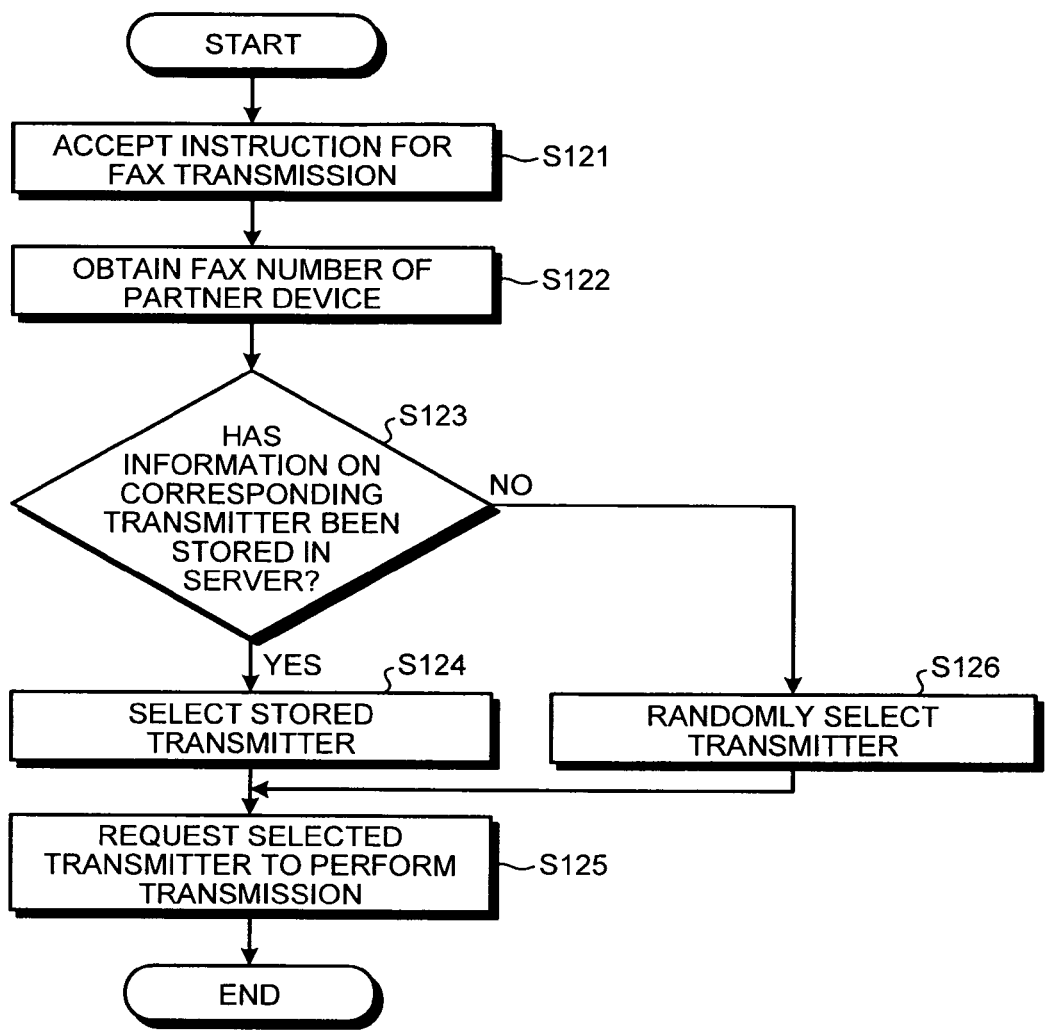
FIG. 18 is a flowchart showing a procedure of a fax transmission requesting process performed by a master device to a transmitter.

Subsequently, a procedure of a fax transmission requesting process performed by the master device 1000 to the transmitter is explained. FIG. 18 is a flowchart showing the procedure of the fax transmission requesting process performed by the master device 1000 to the transmitter.

The input control unit 101 accepts input of an instruction for fax transmission, including a fax number of the partner device 300 which is a destination of fax transmission and image data to be subjected to the fax transmission from a user (Step S121). The selecting unit 1103 obtains the fax number of the partner device 300 from the input control unit 101 (Step S122).

The selecting unit 1103 checks whether information on the transmitter associated with the fax number of the partner device 300 is stored in the server 400 via the communication unit 1109 (Step S123). When the selecting unit 1103 confirms that information on the transmitter associated with the fax number of the partner device 300 is stored in the server 400

(YES at Step S123), the selecting unit 1103 acquires a stored device ID of the transmitter from the server 400 (Step S124).

On the other hand, when the selecting unit 1103 does not confirm that information on the transmitter associated with the fax number of the partner device 300 is not stored in the server 400 (NO at Step S123), the selecting unit 1103 randomly selects the transmitter (Step S126).

The communication unit 1109 transmits a request for fax transmission to the slave device 1200 identified by the acquired device ID of the transmitter or the randomly-selected slave device 1200 (Step S125). This allows the master device 1000 to skip the process of selecting the transmitter by comparing the communication capacity of the partner device 300 with the communication capacities of the slave devices 1200, and therefore it is possible to improve the communication performance.

Figure 19:
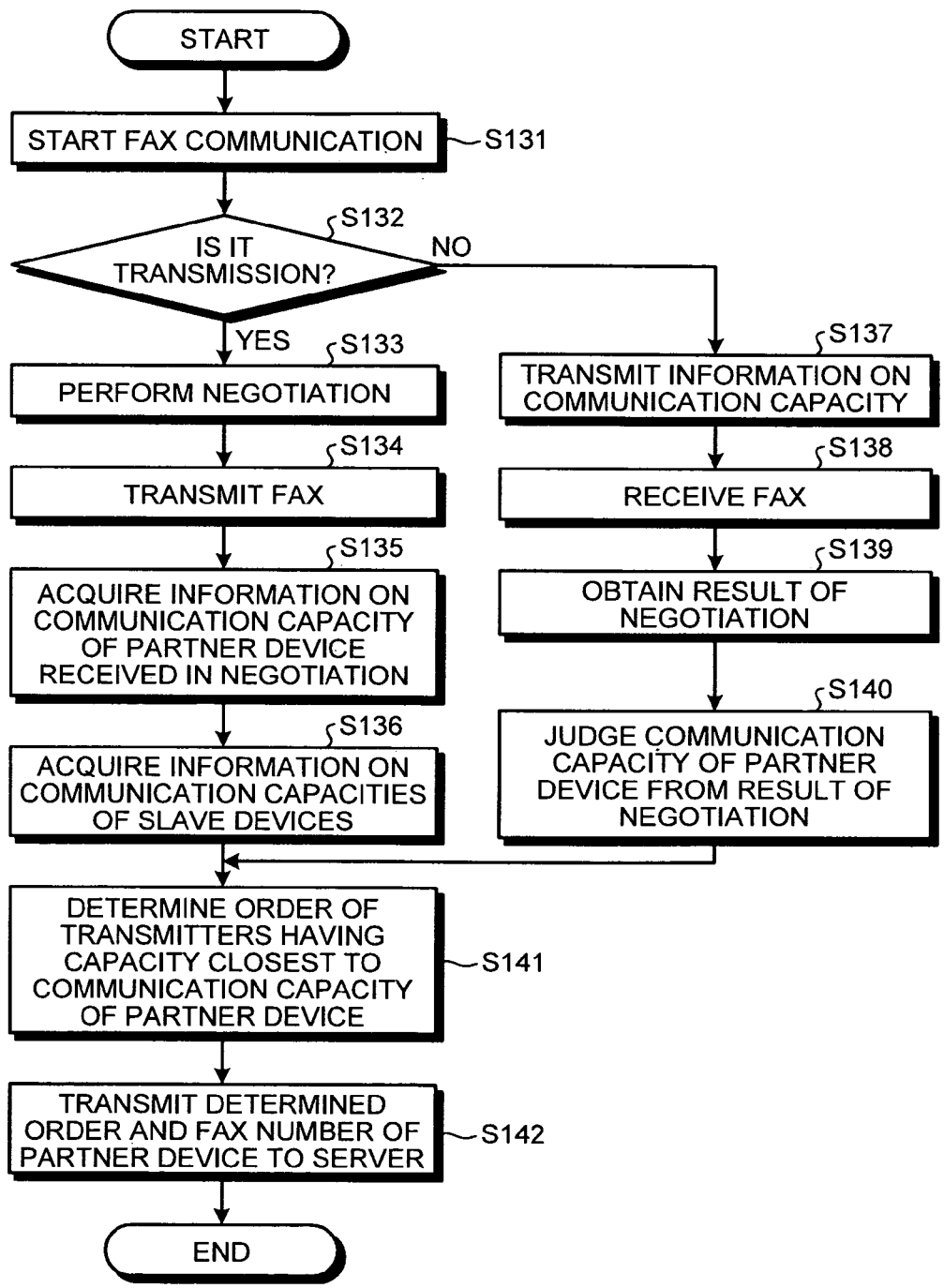
FIG. 19 is a flowchart showing a procedure of another example of the transmitter selecting process performed by the slave device.

Subsequently, a procedure of another example of the transmitter selecting process performed by the slave device 1200 is explained. FIG. 19 is a flowchart showing the procedure of the transmitter selecting process performed by the slave device 1200.

Processes at Steps S131 to S140 are identical to Steps S11 to S16 and S17 to S20 of the transmitter selecting process shown in FIG. 4 described in the first embodiment.

At Step S136, the first acquiring unit 1203 acquires information on respective communication capacities of all the slave devices 1200 (Step S136). The selecting unit 1204 selects a plurality of slave devices 1200 having communication capacity close to the communication capacity of the partner device 300, and determines the selecting order (Step S141). The communication unit 1209 transmits the determined selecting order, a fax number of the partner device 300, and a device ID of the slave device 1200 selected as the transmitter to the server 400 (Step S142).

Therefore, even if the slave device 200 selected as the transmitter is in an incommunicable state, fax transmission is performed by the slave device 200 given the next highest priority; therefore, communication processing can be performed without interruption.

Figure 20:
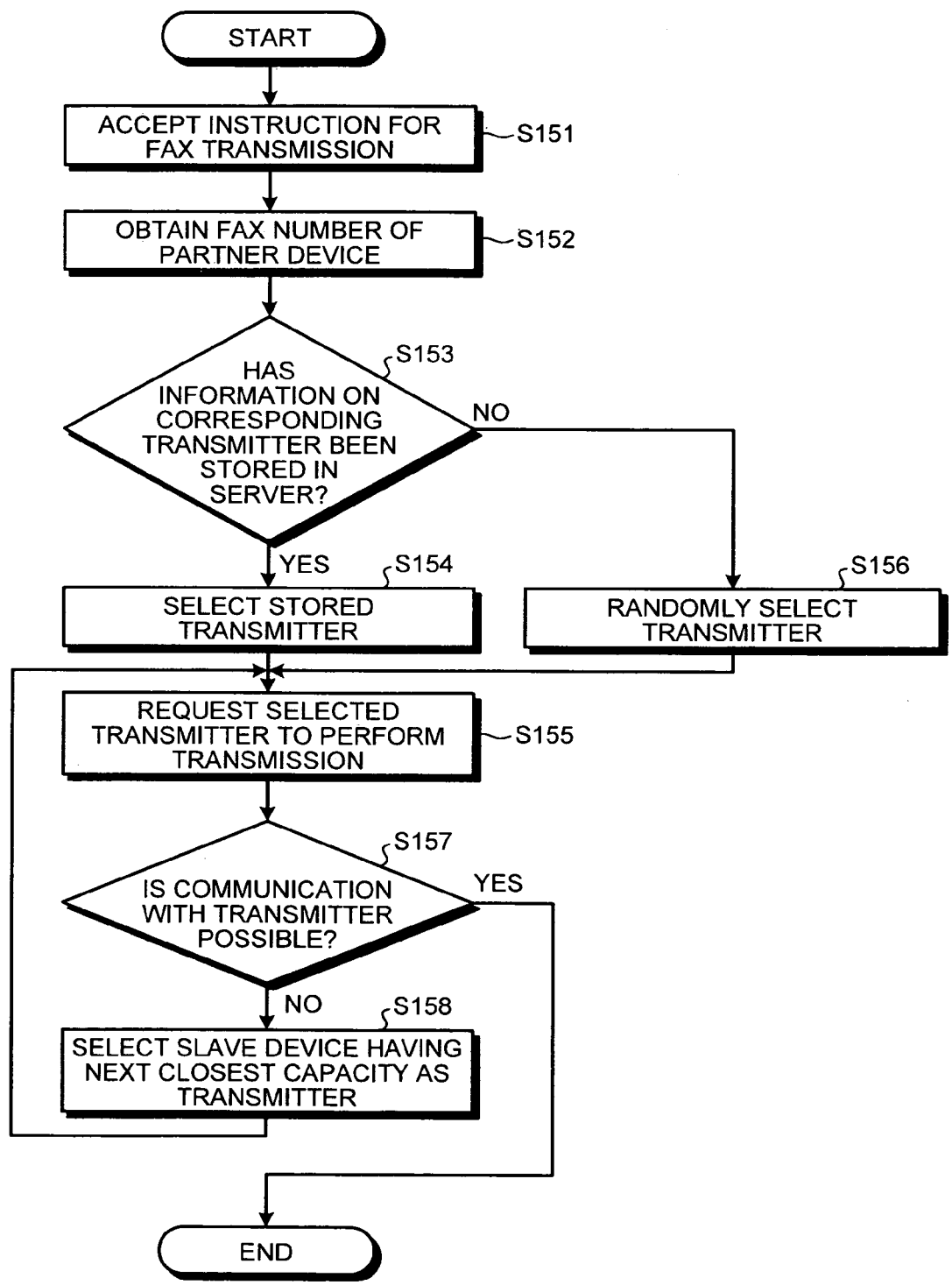
FIG. 20 is a flowchart showing a procedure of another example of the fax transmission requesting process performed by the master device to a transmitter.

Subsequently, a procedure of another example of the fax transmission requesting process performed by the master device 1000 to the transmitter is explained. FIG. 20 is a flowchart showing the procedure of the fax transmission requesting process performed by the master device 1000 to the transmitter.

Processes at Steps S151 to S156 are identical to Steps S121 to S126 of the fax-transmission requesting process shown in FIG. 18.

At Step S157, the selecting unit 1104 checks whether the transmitter to which the communication unit 1109 has transmitted the request for transmission is in a communicable state (Step S157). When the selecting unit 1103 confirms that the transmitter to which the communication unit 1109 has transmitted the request for transmission is in an incommunicable state (NO at Step S157), the selecting unit 1103 selects the next-ranked transmitter in the selecting order stored in the server 400 (Step S158). The communication unit 1109 requests the selected transmitter to perform fax transmission (Step S155).

In this manner, according to the present embodiment, the master device 1000 acquires a device ID of the transmitter associated with the partner device 300 from the server 400, and therefore can select the most suitable transmitter for communication capacity of the partner device without performing the transmitter selecting process.

Figure 21:
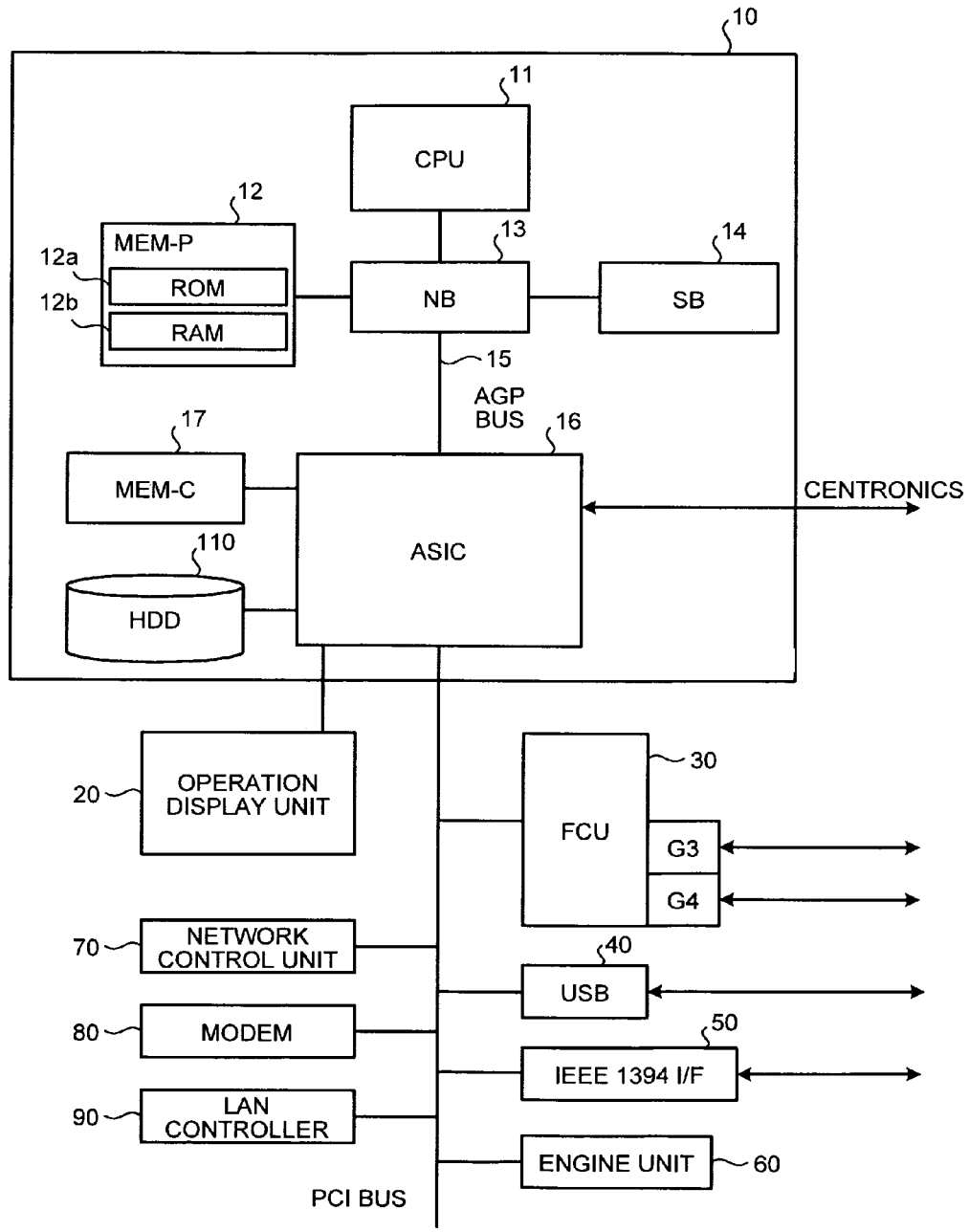
FIG. 21 is a block diagram showing a hardware configuration of the image processing apparatuses according to the present embodiments.

FIG. 21 is a block diagram showing a hardware configuration of the image processing apparatuses 100, 200, 1000, and 1200 (hereinafter, collectively referred to as the "multifunction peripheral (MFP) 100") according to the present embodiments. As shown in FIG. 21, the MFP 100 as the image processing apparatuses includes a controller 10 and an engine unit 60. The controller 10 and the engine unit 60 are connected by a PCI (Peripheral Component Interface) bus. Furthermore, a network control unit 70, a modem 80, and a LAN controller 90 are connected to the PCI bus.

The controller 10 is a controller which controls the entire MFP 100 and controls drawing, communications, and input from an operating unit (not shown). The engine unit 60 is such as a printer engine which can be connected to the PCI bus; for example, the engine unit 60 is a black-and-white plotter, a 1-drum color plotter, a 4-drum color plotter, a scanner, or a fax unit, etc. Incidentally, the engine unit 60 includes an image processing part for performing error diffusion, gamma conversion, or the like in addition to the so-called engine part such as a plotter.

The controller 10 includes a CPU 11, a North Bridge (NB) 13, a system memory (MEM-P) 12, a South Bridge (SB) 14, a local memory (MEM-C) 17, an ASIC (Application Specific Integrated Circuit) 16, and a hard disk drive (HDD) 110. The NB 13 and the ASIC 16 are connected by an AGP (Accelerated Graphics Port) bus 15. The MEM-P 12 includes a ROM (Read Only Memory) 12a and a RAM (Random Access Memory) 12b.

The CPU 11 controls the entire. MFP 100, and has a chipset composed of the NB 13, the MEM-P 12, and the SB 14. The CPU 11 is connected to other devices via the chipset.

The NB 13 is a bridge configured to connect the CPU 11 to the MEM-P 12, the SB 14, and the AGP bus 15, and includes a memory controller configured to control read/write with respect to the MEM-P 12 and the like, a PCI master, and an AGP target.

The MEM-P 12 is a system memory used as a memory used to store a program or data, a memory used to deploy the program or data, a memory used for drawing by a printer, and the like, and is composed of the ROM 12a and the RAM 12b. The ROM 12a is a read only memory used as a memory used to store a program or data. The RAM 12b is a read-write memory used as a memory used to deploy the program or data, a memory used for drawing by a printer, and the like.

The SB 14 is a bridge used to connect the NB 13 to a PCI device and a peripheral device. The SB 14 is connected to the NB 13 via the PCI bus, and, for example, a network interface (I/F) is also connected to the PCI bus. A network interface (I/F) unit and the like are connected to the PCI bus.

The ASIC 16 is an image processing IC (Integrated Circuit) including hardware components for image processing. The ASIC 16 serves as a bridge that connects the AGP bus 15, the PCI bus, the HDD 110, and the MEM-C 17. The ASIC 16 is composed of a PCI target, an AGP master, an arbiter (ARB) which is the core of the ASIC 16, a memory controller for controlling the MEM-C 17, a plurality of DMACs (Direct Memory Access Controllers) that performs rotation of image data or the like by a hardware logic, and a PCI unit that performs data transfer between the controller 10 and the engine unit 60 via the PCI bus. An FCU (Facsimile Control Unit) 30, a USB (Universal Serial Bus) 40, and an IEEE 1394 (the Institute of Electrical and Electronics. Engineers 1394) interface 50 are connected to the ASIC 16 via the PCI bus. An operation display unit 20 is directly connected to the ASIC 16.

The MEM-C 17 is a local memory used as a buffer of image to be copied and a code buffer. The HDD 110 is a storage used to store therein image data, a program, font data, and a form.

The AGP bus 15 is a bus interface for a graphic accelerator card proposed to speed up a graphics operation, and accelerates the graphic accelerator card by directly accessing the MEM-P 12 at high throughput.

The LAN controller 90 decodes data received from a packet network (not shown) which transmits and receives data to/from the LAN controller 90 or encodes data to be transmitted to the packet network, and works with other connected devices by buffering a transmit frame or a received frame.

The modem 80 is, for example, a G3 or G4 facsimile modem, and modulates data to be transmitted to a telephone network (not shown) via the network control unit 70 or demodulates a signal received from the telephone network via the network control unit 70. Furthermore, the modem 80 passes a DTMF signal corresponding to a fax number of the partner device 300.

The network control unit 70 is connected to the telephone network, and performs control of connection with a line, such as detection of polar reaction of a line of the telephone network, close or open of a direct current loop of the line, detection of open of the line, detection of a dial tone, detection of a tone signal such as a signal of a busy tone, and detection of a call signal, and sending of a selection signal corresponding to a fax number of a partner device by a dial pulse signal conforming to a dial line.

According to the present invention, it is possible to select the most suitable transmitter according to capacity of the receiver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus connected to a plurality of transmitters with a facsimile communication function via a network, the image processing apparatus comprising:
    a first acquiring unit that acquires information on respective communication capacities of the transmitters and information on communication capacity of a partner device to be in facsimile communication with a transmitter;
    a selecting unit that selects a transmitter having communication capacity that is the same as or closest to the communication capacity of the partner device from the plurality of transmitters;
    an accepting unit that accepts an instruction for facsimile transmission;
    a reading unit that reads image data subjected to the facsimile transmission;
    a facsimile-transmission-request transmitting unit that transmits a request to fax the read image data to the partner device to the selected transmitter;
    a determining unit that determines whether the partner-device identifying information that is the same as the accepted partner-device identifying information is stored in the storage unit, and, if it is determined that the partner-device identifying information is stored in the storage unit, determines whether the information on the communication capacity stored in the storage unit is identical to the acquired information on the communication capacity of the partner device; and
    an updating unit that updates the information on the communication capacity of the partner device stored in the storage unit to the acquired information on the communication capacity of the partner device if it is determined that the information on the communication capacity stored in the storage unit is not identical to the acquired information on the communication capacity of the partner device, wherein:
    the first acquiring unit acquires the information on the communication capacity of the partner device from the transmitter,
    the accepting unit further accepts input of partner-device identifying information identifying the partner device,
    the image processing apparatus further includes a storage unit that stores therein the acquired information on the communication capacity of the partner device and the accepted partner-device identifying information in an associated manner, and
    the first acquiring unit acquires the information on the communication capacity of the partner device associated with the accepted partner-device identifying information from the storage unit.

2. The image processing apparatus according to claim 1, wherein
    the accepting unit accepts input of a value of communication capacity that the transmitter to be selected by the selecting unit should have from a user, and
    the selecting unit selects the transmitter which has communication capacity that is the same as or closest to the communication capacity of the partner device indicated by the acquired information and also has a value closest to the accepted value from the plurality of transmitters.

3. An image processing system comprising the image processing apparatus of claim 1 and a plurality of second image processing apparatuses with a facsimile communication function, wherein
    the second image processing apparatuses include:
        a facsimile-transmission-request receiving unit that receives the request from the first image processing apparatus; and
        an image-data transmitting unit that faxes the image data to the partner device upon reception of the request.

4. The image processing system according to claim 3, wherein
    the second image processing apparatuses further include:
        a second acquiring unit that acquires information on communication capacity of the partner device, which is the destination of the facsimile transmission, from the partner device; and
        a communication-capacity transmitting unit that transmits the acquired information on the communication capacity of the partner device to the first image processing apparatus.

5. The image processing system according to claim 3, wherein
    the second image processing apparatuses further include:
        a communication-condition receiving unit that receives a communication condition for facsimile communication with a partner device, which is a source of facsimile transmission, from the partner device;
        a judging unit that judges the communication capacity of the partner device on the basis of the received communication condition and its own communication capacity of the second image processing apparatus; and
        a communication-capacity transmitting unit that transmits information on the judged communication capacity of the partner device to the first image processing apparatus.

6. The image processing system according to claim 3, wherein
    the second image processing apparatuses further include:

a second acquiring unit that acquires the information on the communication capacity of a partner device, which is a source of facsimile transmission, from the partner device according to a protocol; and a communication-capacity transmitting unit that transmits the acquired information on the communication capacity of the partner device to the first image processing apparatus.

7. The image processing system according to claim 6, wherein the second image processing apparatuses further include:

a communication-capacity-request transmitting unit that requests the partner device to transmit the information on the communication capacity of the partner device, and the second acquiring unit acquires the information on the communication capacity of the partner device from the partner device according to the protocol upon transmission of the request.

8. An image processing system comprising a first image processing apparatus, a plurality of second image processing apparatuses with a facsimile communication function, and a server, wherein the second image processing apparatuses include:

a first acquiring unit that acquires information on communication capacity of a partner device and information on respective communication capacities of the other second image processing apparatuses;

a selecting unit that selects an image processing apparatus having communication capacity that is the same as or closest to the communication capacity of the partner device indicated by the acquired information from the second image processing apparatuses as a transmitter which performs facsimile transmission; and a partner-device-identifying-information transmitting unit that transmits transmitter identifying information identifying the selected transmitter and partner-device identifying information identifying the partner device to the server, the server includes a storage unit that stores therein the transmitter identifying information and the partner-device identifying information received from the second image processing apparatus in an associated manner, and the first image processing apparatus includes:

an accepting unit that accepts an instruction for facsimile transmission, the instruction including image data subjected to the fax transmission and the partner-device identifying information identifying the partner device which is a destination of the facsimile transmission;

a transmitter-identifying-information-request transmitting unit that transmits the partner-device identifying information and a request for acquisition of the transmitter identifying information associated with the partner-device identifying information to the server;

a second receiving unit that receives the transmitter identifying information associated with the partner-device identifying information from the server; and a facsimile-transmission-request transmitting unit that transmits a request for fax transmission of the image data to the transmitter identified by the acquired transmitter identifying information.

9. The image processing system according to claim 8, wherein the selecting unit selects a plurality of image processing apparatuses having communication capacity that is the same as or close to the communication capacity of the partner device from the second image processing apparatuses, and determines order of the selected plurality of image processing apparatuses from closest to farthest in communication capacity from the partner device, and the partner-device-identifying-information transmitting unit further transmits the determined order to the server.

10. A method for processing an image having an image processing apparatus connected to a plurality of transmitters with a facsimile communication function via a network, the method comprising:

acquiring information, via a first acquiring unit, on respective communication capacities of the transmitters and information on communication capacity of a partner device to be in facsimile communication with a transmitter;

selecting a transmitter, via a selecting unit, having communication capacity that is the same as or closest to the communication capacity of the partner device from the plurality of transmitters;

accepting an instruction, via an accepting unit, for facsimile transmission;

reading image data, via a reading unit, subjected to the facsimile transmission;

transmitting a request, via a facsimile-transmission-request transmitting unit, to fax the read image data to the partner device to the selected transmitter;

determining, via a determining unit, whether the partner-device identifying information that is the same as the accepted partner-device identifying information is stored in the storage unit, and, if it is determined that the partner-device identifying information is stored in the storage unit, determines whether the information on the communication capacity stored in the storage unit is identical to the acquired information on the communication capacity of the partner device; and updating the information, via an updating unit, on the communication capacity of the partner device stored in the storage unit to the acquired information on the communication capacity of the partner device if it is determined that the information on the communication capacity stored in the storage unit is not identical to the acquired information on the communication capacity of the partner device, wherein:

the first acquiring unit acquires the information on the communication capacity of the partner device from the transmitter, the accepting unit further accepts input of partner-device identifying information identifying the partner device, the image processing apparatus further includes a storage unit that stores therein the acquired information on the communication capacity of the partner device and the accepted partner-device identifying information in an associated manner, and the first acquiring unit acquires the information on the communication capacity of the partner device associated with the accepted partner-device identifying information from the storage unit.

* * * * *

UNITED STATES PATENT AND TRADEMARK OFFICE
CERTIFICATE OF CORRECTION

PATENT NO. : 8,681,389 B2
APPLICATION NO. : 13/067561
DATED : March 25, 2014
INVENTOR(S) : Masafumi Nagao et al.

Page 1 of 1

It is certified that error appears in the above-identified patent and that said Letters Patent is hereby corrected as shown below:

Title Page: Item (30) insert

-- Foreign Application Priority Data

(30)   June 28, 2010   (JP)........................................................2010-146753 --

Signed and Sealed this
Seventeenth Day of June, 2014

Michelle K. Lee
*Deputy Director of the United States Patent and Trademark Office*